(12) United States Patent
Volkerink et al.

(10) Patent No.: US 11,829,829 B2
(45) Date of Patent: Nov. 28, 2023

(54) WIRELESS VIBRATION MONITORING SENSOR DEVICE WITH FLEXIBLE FORM FACTOR

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/468,645

(22) Filed: Sep. 7, 2021

(65) Prior Publication Data

US 2022/0076091 A1    Mar. 10, 2022

Related U.S. Application Data

(60) Provisional application No. 63/081,887, filed on Sep. 22, 2020, provisional application No. 63/075,135, filed on Sep. 5, 2020.

(51) Int. Cl.
    *G06K 19/077*      (2006.01)
    *G06K 19/07*       (2006.01)
    *G06K 19/02*       (2006.01)

(52) U.S. Cl.
    CPC ....... *G06K 19/0776* (2013.01); *G06K 19/025* (2013.01); *G06K 19/0717* (2013.01); *G06K 19/0719* (2013.01); *G06K 19/0723* (2013.01)

(58) Field of Classification Search
    CPC .................................................. G06K 19/0717
    USPC ........................................ 235/488, 492, 439
    See application file for complete search history.

(56) References Cited

U.S. PATENT DOCUMENTS

| | | | |
|---|---|---|---|
| 2004/0075616 A1* | 4/2004 | Endo | G06K 19/07783 343/895 |
| 2008/0122631 A1 | 5/2008 | Kodukula et al. | |
| 2010/0314443 A1 | 12/2010 | Cudzilo | |
| 2011/0101108 A1* | 5/2011 | Slikkerveer | G06K 19/0705 235/492 |
| 2015/0248604 A1* | 9/2015 | Diorio | H01L 23/49855 29/601 |
| 2020/0151655 A1 | 5/2020 | Khoche | |

FOREIGN PATENT DOCUMENTS

| | | | |
|---|---|---|---|
| JP | 20033209421 A | 7/2003 | |
| WO | WO-2019118440 A1 * | 6/2019 | B32B 27/08 |

OTHER PUBLICATIONS

International Patent Application No. PCT/US2021/049325, International Search Report and Written Opinion dated Dec. 16, 2021, 13 pages.

* cited by examiner

*Primary Examiner* — Suezu Ellis

(57) ABSTRACT

A flexible sensor device includes a device layer including at least a first sensor configured to measure sensor data relevant to an object of interest, a flexible electronics layer including flexible circuit connected to the first sensor, a flexible substrate located between the flexible electronics layer and a first adhesive layer, a flexible tape cover that is on the device layer opposite the flexible substrate, the flexible tape cover covering the device layer, and a coupling element, located in a first aperture, the coupling element coupling the first sensor to the object of interest when the sensor device is attached to the object of interest. The first aperture is in one of the flexible substrate and the flexible substrate, overlapping the first sensor and exposing the coupling element to the object of interest.

20 Claims, 20 Drawing Sheets

WIRELESS VIBRATION MONITORING SENSOR DEVICE WITH FLEXIBLE FORM FACTOR

CROSS-REFERENCE TO RELATED APPLICATIONS

This application claims priority to U.S. Provisional Patent Application No. 63/075,135, filed Sep. 5, 2020, and to U.S. Provisional Patent Application No. 63/081,887, filed Sep. 22, 2020,

FIELD OF THE DISCLOSURE

This disclosure generally relates to wireless internet of things (IOT) devices, in particular, sensor devices.

BACKGROUND

In cases where a sensor needs to be physically coupled or attached to an object for detecting a property of the object (e.g. vibrations, temperature, or other properties), the enclosure of the sensor and associated electronics may interfere with the performance of the sensor. For example, the mass of an enclosure and associated components for a vibration sensor device may result in unwanted mechanical resonances that reduce the accuracy of the vibration sensor at certain frequencies. In some cases, components in the enclosure and electronics (e.g., an o-ring, a seal, and/or an adhesive) may be absorptive and reduce the sensitivity of the sensor device, by dampening energy, properties, and/or signals being sensed. Large and/or rigid components in the enclosure and electronics for a sensor device may also introduce unwanted parasitics (e.g., capacitance, inductance, impedance, etc.) that impede the sensing capabilities of the sensor device. In applications where the sensor must be coupled to an object with irregular or non-planar surfaces, effectively coupling a traditional sensor device with a rigid, non-flexible form factor to the object may be difficult. A sensor device with a versatile form factor and high sensing capabilities is desired.

SUMMARY

The present disclosure relates to a sensor device for monitoring one or more properties and/or signals relevant to an object of interest. The sensor device (also referred to herein as a "adhesive tape platform) may have a flexible form factor and light weight that allows it to function both as a sensor device, including wireless transducing components, and an adhesive tape that can be used to seal items or adhere to items. The adhesive tape platform includes a flexible substrate. The flexible substrate includes a substrate layer, and a first adhesive layer on the substrate layer that adheres the substrate layer to a device layer on the flexible substrate. The device layer on the flexible substrate includes at least a first sensor configured to measure sensor data relevant to an object of interest that the adhesive tape platform is applied to. The device layer also includes a flexible electronics layer including a flexible electronic circuit connected to the first sensor.

A coupling element beneath the device layer mechanically couples the first sensor to the object of interest (e.g., contacts the first sensor and the object of interest, or is located between the first sensor and the object of interest to allow energy (mechanical and/or thermal) transfer therebetween) when the adhesive tape platform is applied to the object of interest. In some embodiments, the coupling element has a rigidity that is higher than a rigidity of a first material of the sensor device. In some embodiments, the coupling element has a damping capacity that is lower than a damping capacity of the first material. In some embodiments, the coupling element has a thermal conductivity higher than a first material of the sensor device. For example, the first material may be a material of the flexible substrate. A first surface of the coupling element is configured to mechanically couple to a surface of the object of interest when the sensor device is applied to the object of interest, and a second surface of the coupling element is configured to mechanically couple to the first sensor. In some embodiments, the coupling element directly contacts the surface of the object of interest through an opening in the flexible substrate. The second surface of the coupling element may directly contact the first sensor, according to some embodiments. A flexible cover layer on the device layer covers the device layer and the flexible substrate.

In other embodiments, the sensor device does not include a coupling element. Instead, the opening in the flexible substrate exposes the first sensor, allowing for the first sensor to directly contact the surface of the object of interest. With the coupling element and the aperture, the sensor device achieves a flexible form factor without sacrificing sensing capabilities.

DETAILED DESCRIPTION

Figure 1A:
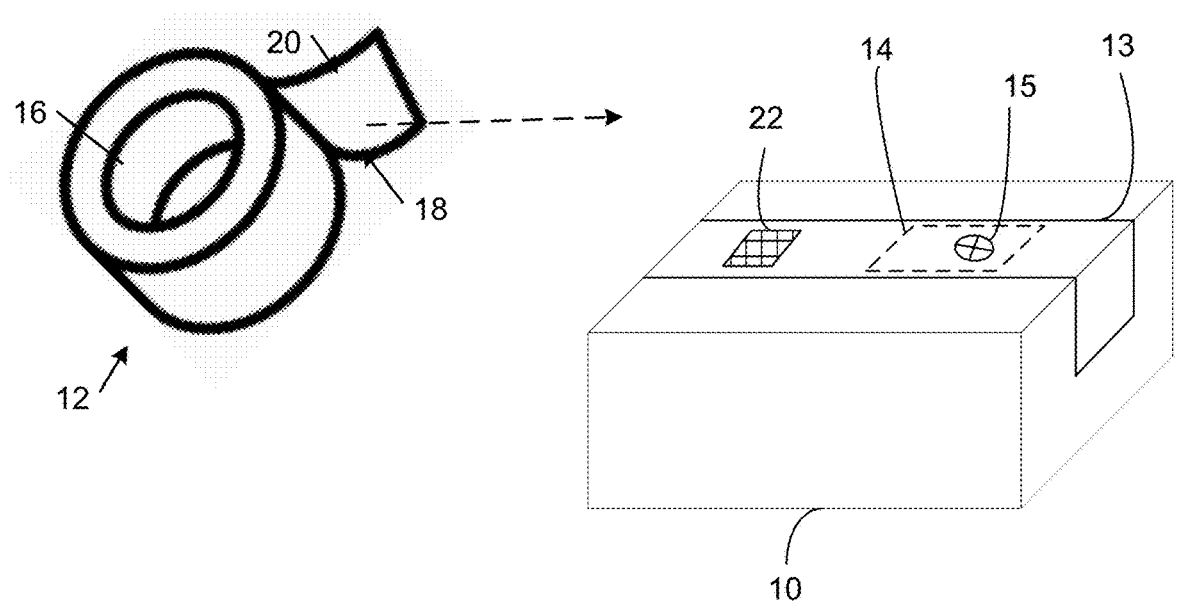
FIG. 1A is a diagrammatic view of an asset that has been sealed for shipment using a segment of an example adhesive tape platform dispensed from a roll, according to some embodiments.

Conventional sensor devices typically include enclosures and components with rigid form factors. In the present disclosure, a sensor device (also referred to herein as an "adhesive tape platform") has a form factor of a flexible adhesive tape. The adhesive tape platform includes a flexible substrate with an adhesive on an outer surface of the flexible substrate, a flexible cover layer, a device layer between the flexible substrate and the flexible cover layer, and (optionally) a flexible battery. The adhesive tape platform has a dual functionality as both a sensor device for measuring properties and/or signals relevant to an object of interest and an adhesive tape that can be adhered to the objects of interest or used to seal or close items (e.g., a box). The form factor of the adhesive tape platform allows for the sensor device to be coupled to objects and/or people directly with an easier and faster installation compared to conventional sensor devices. For example, with a traditional sensor device that has a rigid form factor, coupling of the conventional sensor device to an object of interest may involve applying and curing an epoxy while holding the conventional sensor device in a corresponding position. The removal of such traditional sensor devices from the object of interest may also be difficult, in such cases. In contrast, coupling the adhesive tape platform to an object of interest involves simply applying the adhesive tape platform to the object of interest with the adhesive on the substrate contacting a surface of the object of interest. The adhesive tape platform may easily be removed from an object of interest after installation, much like an ordinary adhesive tape (e.g., duct tape, masking tape, etc.).

In applications that require vibration monitoring, the use of traditional sensor devices that have a rigid enclosure and components (o-ring, screws, etc.) may have limitations on their sensing ability related to the enclosure and components. For example, the structure and mass of the rigid enclosure and components may introduce unwanted mechanical resonances which reduce the ability of a sensor device to accurately measure vibrations at some frequencies, particularly at higher frequencies of vibration. Additionally, the use of epoxy to adhere or physically couple the sensor may introduce other difficulties in sensing vibrations from the object of interest (e.g., dampening of the vibrations). The flexible and lightweight form factor of the adhesive tape platform reduces the limitations associated with traditional sensor devices such as mechanical resonances, dampening, and parasitics (e.g., capacitance, inductance).

In some embodiments, the sensor device is an adhesive tape platform or a segment thereof. The adhesive tape platform includes wireless transducing components and circuitry that perform communication and/or sensing. The adhesive tape platform has a flexible adhesive tape formfactor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," "sensor device," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers). In some embodiments, the adhesive tape platform 12 includes a sensor marking 15 on the top side of the adhesive tape platform that visually indicates a position of a sensor or array of sensors in the adhesive tape platform 12.

Figure 1B:
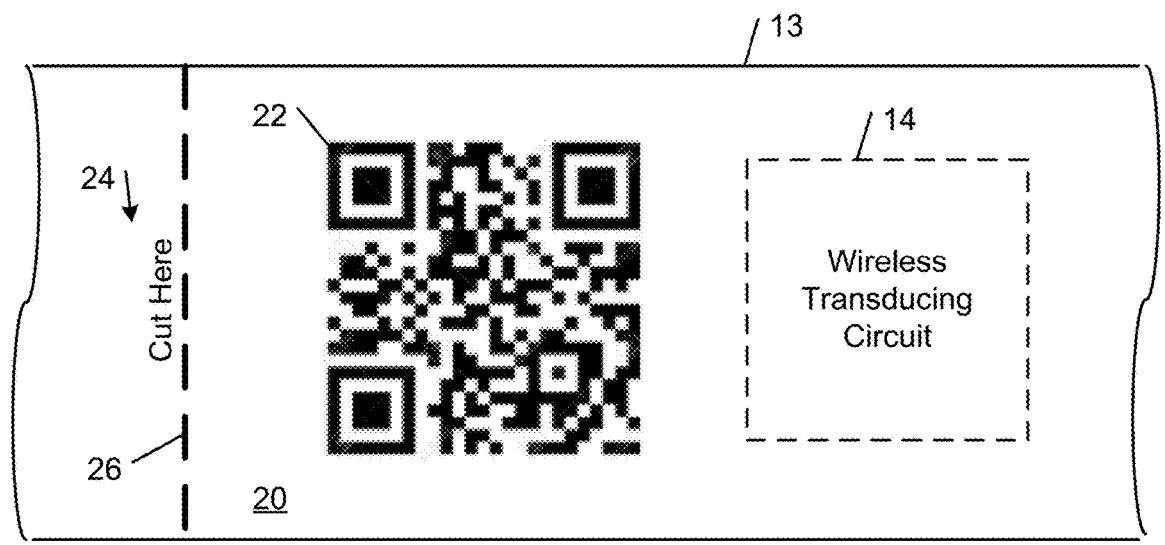
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 1C:
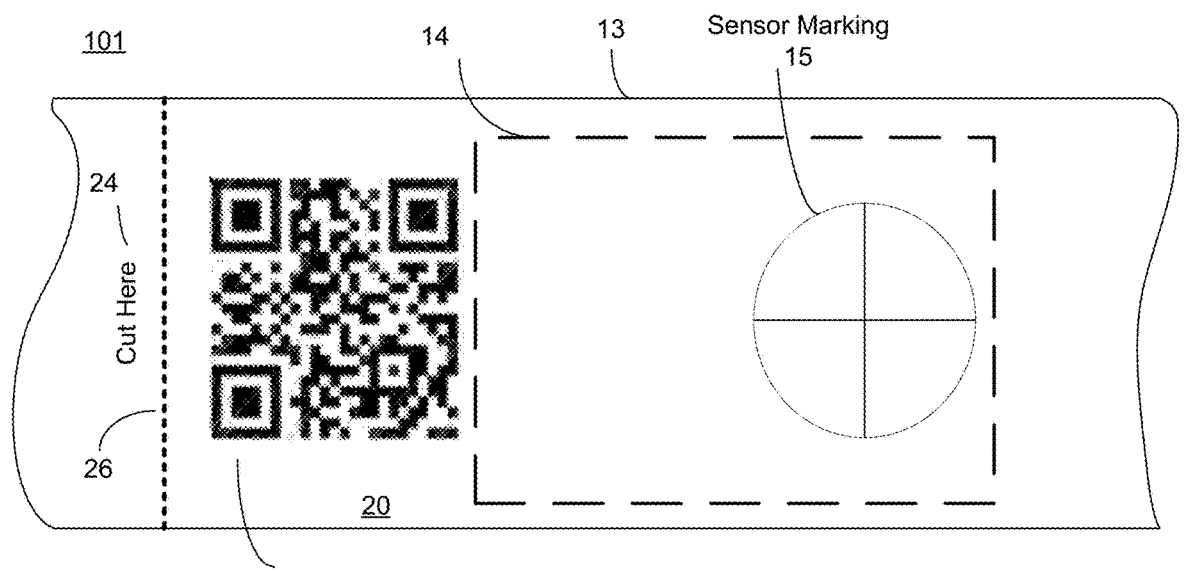
FIG. 1C is a diagrammatic top view of a portion of the segment of the example adhesive tape platform shown in FIG. 1A, according to alternate embodiments.

FIG. 1C is a diagrammatic top view of a portion of the segment 13 of the example adhesive tape platform shown in FIG. 1A, according to embodiments where the top side of the segment 13 includes a sensor marking 15, in addition to the components shown in FIG. 1B. In the illustrated example, the segment 13 of the adhesive tape platform 12 includes a two-dimensional bar code (e.g., a QR Code) 22, written instructions 24 (i.e., "Cut Here"), a sensor marking 15, and an associated cut line 26 that indicates where the user should cut the adhesive tape platform 12. The written instructions 24, the sensor marking 15, and the cut line 26 typically are printed or otherwise marked on the top non-adhesive side 20 of the adhesive tape platform 12 during manufacture. The two-dimensional bar code 22, on the other hand, may be marked on the non-adhesive side 20 of the adhesive tape platform 12 during the manufacture of the adhesive layer 12 or, alternatively, may be marked on the non-adhesive side 20 of the adhesive tape platform 12 as needed using, for example, a printer or other marking device.

The sensor marking 15 indicates the position of one or more sensors included in the wireless transducing circuit 14 of the segment 13 of the adhesive tape platform 12. The sensor marking 15 overlaps with the position of one or more sensors in the wireless transducing circuit 14 of the segment 13. In some embodiments, the sensor marking 15 overlaps with a coupling element (e.g., coupling element 28 discussed below with respect to FIGS. 1D, 1E, 1F, 5E, and 11A). The sensor marking 15 may be used to assist in the installation of the segment 13 of the adhesive tape platform 12. The sensor marking 15 provides a visual aid for a human operator and/or machinery installing the segment 13, according to some embodiments. In cases where the one or more sensors of the segment 13 must be positioned in a specific location on an object of interest, the sensor marking 15 provides a visual reference for the human operator or machinery applying the segment to the object of interest.

In some embodiments, the sensor marking 15 is a graphical symbol or image printed onto the outer surface of the flexible cover layer, as shown in FIG. 1A and FIG. 1C. In the example shown in FIG. 1A and FIG. 1C, the sensor marking 15 appears as a crosshair symbol which indicates the position and circumference of the coupling element. The sensor marking 15 may include other symbols (e.g., bullseye, circle, target, etc.), images, or text than shown in FIG. 1A and FIG. 1C. In other embodiments, the sensor marking 15 is applied to the outer surface of the flexible cover layer by other means, for example, by using an adhesive label including the sensor marking 15 or by embossing the sensor marking 15 on the non-adhesive side 20 of the segment 13. Although the sensor marking 15 is shown in the example of FIG. 1C in the form of a circle and a cross, the sensor marking 15 may appear differently, according to other embodiments. For example, the sensor marking 15 may include a different shape such as a rectangle, a box, a triangle, or some other shape. The shape of the sensor marking 15 may correspond to a shape of a sensor in the adhesive tape platform segment 13. The sensor marking 15 may include one or more different colors to visually highlight or indicate the position of a sensor. In some embodiments, the sensor marking 15 may include a symbol or text that corresponds to a type of sensor. For example the sensor marking 15 may include text that says "vibration and temperature sensor located here."

Figure 1D:
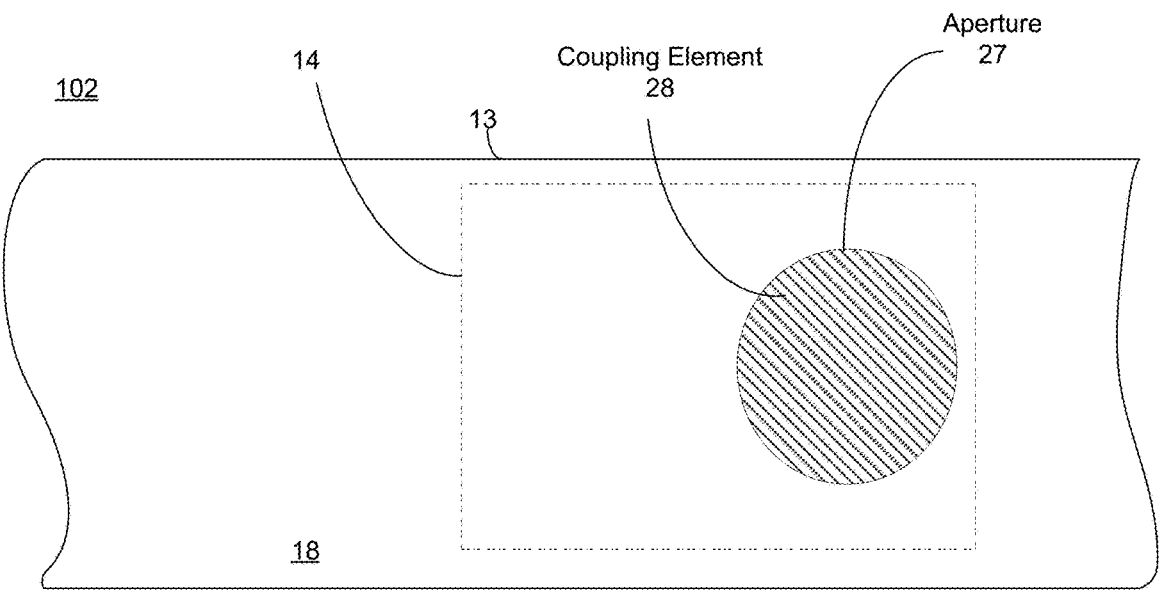
FIG. 1D is a diagrammatic bottom view of a portion of the segment of the example adhesive tape platform shown in FIG. 1A, according to some embodiments.

FIG. 1D shows a bottom view 202 of the segment 13 of the adhesive tape platform 12 shown in FIG. 1A. The bottom view 202 is an opposite view with respect to the top view 201 depicted in FIG. 1C The bottom view 202 shows the adhesive side 18 of the segment 13. Overlapping a portion of the wireless transducing circuit 14 is an aperture 27 in the adhesive tape platform 12 that exposes a coupling element 28. The aperture 27 is an opening in a substrate layer on the adhesive side 18 of the segment 13. The coupling element 28 couples one or more sensors in the wireless transducing circuit 14 to a surface of an object being monitored using the segment 13 of the adhesive tape platform 12. The coupling element 238 may mechanically couple, thermally couple, electrically couple, optically couple, or couple in another way the surface of the object to the one or more sensors, according to some embodiments. In cases where the adhesive tape platform is used for vibration monitoring, a coupling element may have a low damping capacity to allow for vibrations to easily transfer from the surface to the one or more sensors without a significant loss of vibrational energy. The coupling element 28 may have a damping capacity that is lower than a damping capacity of a material of the substrate or flexible cover of the adhesive tape platform, for example. In some embodiments, the coupling element 28 is thermally conductive and thermally couples the one or more sensors in the wireless transducing circuit 14 to the surface of the object being monitored. The coupling element 28 may have thermal conductivity that is higher than a thermal conductivity of a material of the substrate or flexible cover of the adhesive tape platform, for example. The coupling element 28 may have some other conductivity (e.g., electrical conductivity) that is higher than a conductivity (e.g., electrical conductivity) of a material of the substrate or flexible cover of the adhesive tape platform, according to some embodiments.

A bottom surface of the coupling element 28 directly or indirectly couples with a surface of the object being monitored when the segment 13 is applied to the surface of the object. According to some embodiments, the bottom surface of the coupling element 28 (shown in FIG. 1D) directly contacts the surface of the object being monitored through the aperture 27. In some embodiments, the segment 13 does not include the aperture 27, and the bottom surface of the coupling element 28 indirectly couples to the surface of the object being monitored. A top surface of the coupling element 28 is mechanically coupled to the one or more sensors in the wireless transducing circuit 14. In some embodiments, the coupling element 28 directly contacts the one or more sensors and/or directly contacts a transducer in the one or more sensors. Thus, the coupling element 28 forms a pathway for transferring vibrations, temperature, and/or some other signal, energy, or other property that can be sensed by a sensor from the surface of the object being monitored to the one or more sensors in the wireless transducing circuit 14. In the example shown in FIGS. 1C and 1D, the sensor marking 15 overlaps with the coupling element 28. In other embodiments, the sensor marking 15 may have a different position and/or configuration. For example, the sensor marking 15 may be in the form of a simple dot which indicates a center of the coupling element 28 or a center of one or more sensors.

The coupling element 28 may include a material that has properties to allow the transmission of vibrations from the object of interest being monitored to the one or more sensors without significant loss. In some embodiments, the coupling element 28 may include a material that has a higher stiffness than a material of a substrate layer of the segment 13 of the adhesive tape platform 12. For example, a Young's modulus of a material of the coupling element 28 may be higher than a Young's modulus of a material of the substrate layer. In some examples, the coupling element may include a metal material. In some embodiments, the coupling element has dimensions that allows for the segment 13 of the adhesive tape platform to maintain an overall flexibility. For example, the coupling element may have a length and width that are both less than 2 cm. A thickness of the coupling element may be less than 1 cm, according to some embodiments. In some embodiments, the coupling element 28 only overlaps a portion of the segment 13, to maintain the overall flexibility of the adhesive tape platform, as seen in FIG. 1D. The coupling element is shown in FIG. 1D having a shape corresponding to a circle (i.e. similar to a coin), according to some embodiments. According to other embodiments, the coupling element has a different shape. For example, the coupling element may have a shape corresponding to a square or rectangular shape. In some embodiments, the coupling element may have a shape corresponding to an oblong, an ellipse, an oval, or a triangle, or some other shape.

In some embodiments, the coupling element is at least partially optically transparent. This may be the case when one of the sensors is an optical sensor, a light sensor, or an infrared light sensor. In further embodiments, the coupling element may be an optical element. For example, the coupling element may be a lens, an objective, a light filter, a light absorber, a polarizer, a polarization rotator, a mirror, a beam splitter, a prism, a diffuser, a diffraction grating, an optical isolator, or some other optical element.

The one or more sensors may comprise an optical sensor, an infrared light sensor, an inductance sensor, an electrical current or voltage sensor, an electrical resistance sensor, a time of flight sensor, a depth sensor, a distance sensor, a sensor that is configured to detect moisture, a water sensor, a motion sensor, an accelerometer, or some other type of sensor, according to some embodiments.

The aperture 27 is a hole or window in the adhesive side 18 of the segment 13 that exposes at least a portion of the coupling element 28 or a portion of one or more sensors in the wireless transducing circuit 14. When the segment 13 is applied to a surface of an object, the exposed portion of the coupling element 28 makes physical contact with the surface through the aperture 27. In embodiments, the coupling element 28 has a dimension (e.g., diameter, width, length, thickness, etc.) that is greater than a corresponding dimension of the aperture 27 (in other words, the aperture 27 is smaller than the coupling element 28). In other embodiments, the coupling element 28 has a dimension (e.g., diameter, width, length, thickness, etc.) that is the same as than a corresponding dimension of the aperture 27 In embodiments, the coupling element 28 has a dimension (e.g., diameter, width, length, thickness, etc.) that is less than a corresponding dimension of the aperture 27 (in other words, the aperture 27 is larger than the coupling element 28). In other embodiments, the segment 13 does not include the aperture 27, and the adhesive side 18 of the segment completely covers the coupling element (i.e., the coupling element 28 is not exposed). In this case, the coupling element indirectly makes contact to the surface of the object through the substrate of the segment 13. In some embodiments, the aperture 27 may be covered by a thin layer of material, a porous material, some other element, or some combination thereof. For example, a thin protective layer that is thinner than a flexible substrate of the segment 13 in areas surrounding the aperture 27 may span (e.g. cover) the aperture 27 to protect the coupling element 28 and the wireless transducing circuit 14 from dust, or other contaminants. In some embodiments, the coupling element 28 includes an adhesive on its bottom surface. The example of the aperture 27 shown in FIG. 1D has a shape corresponding to the shape of the coupling element 28 (i.e., a circle). In other embodiments, the aperture 27 has a different shape from the coupling element 28. The shape of the aperture 27 may be a rectangle, a slit, a square, a triangle, or some other shape.

Figure 1E:
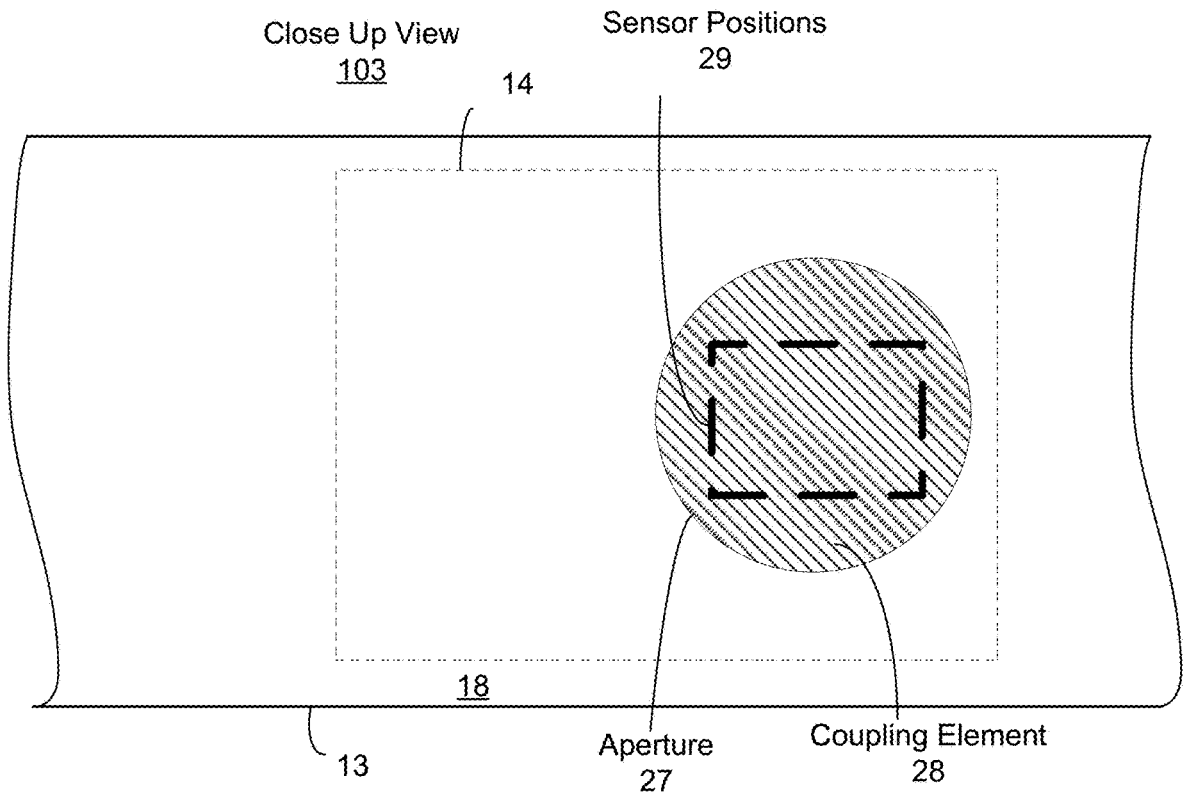
FIG. 1E is a diagrammatic bottom view of a portion of the segment of the example adhesive tape platform shown in FIG. 1A, according to alternative embodiments.

FIG. 1E shows a close up view 103 of the adhesive side 18 of the segment 13 shown in FIG. 1D according to some embodiments, including a portion of the segment 13 that includes the wireless transducing circuit 14. The position 29 of a sensor mechanically coupled to the coupling element 28 is indicated in dotted lines. The sensors is included in the wireless transducer circuit 14, according to some embodiments. Although the example shown in FIG. 1E includes a single sensor, the segment 13 of the adhesive tape platform 12 may include a different number or configuration of sensors than is shown in FIG. 1E.

Figure 1F:
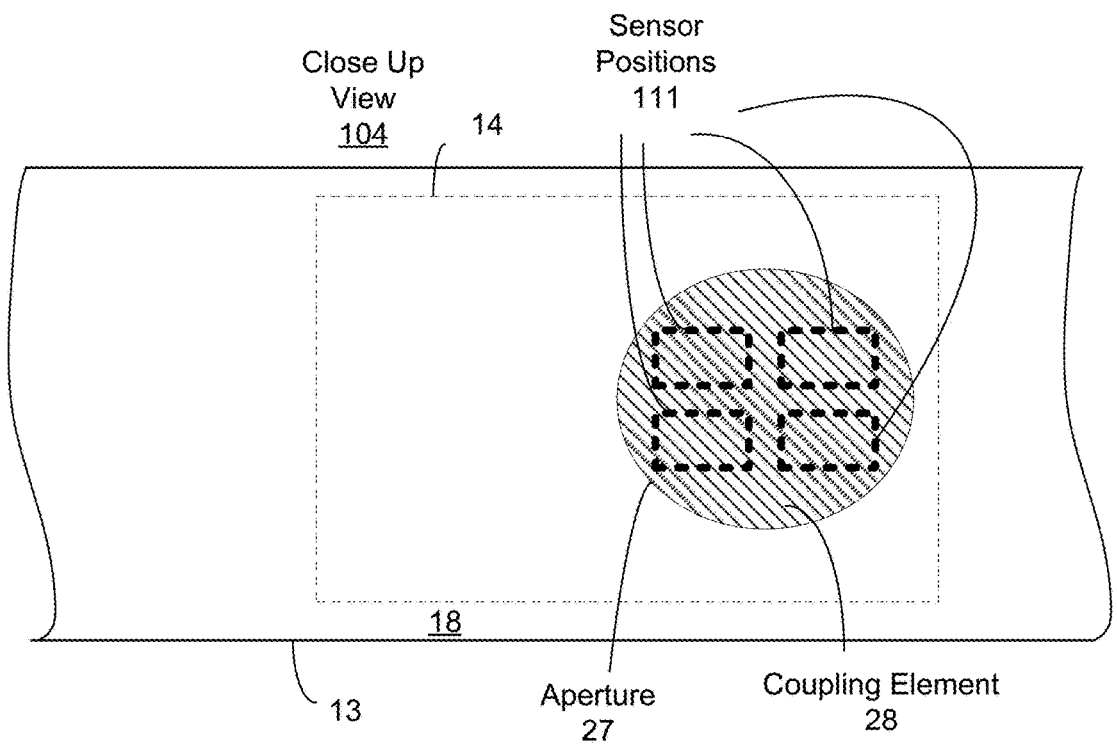
FIG. 1F is a diagrammatic bottom view of a portion of the segment of the example adhesive tape platform shown in FIG. 1A, according to alternative embodiments.

FIG. 1F shows a close up view 104 of the adhesive side 18 of the segment 13 shown in FIG. 1D according to some embodiments where the segment 13 includes multiple sensors, including a portion of the segment 13 that includes the wireless transducing circuit 14. The positions 111 of four sensors mechanically coupled to the coupling element 28 are indicated in dotted lines. The four sensors are included in the wireless transducer circuit 14. Although the example shown in FIG. 1F includes four sensors, the segment 13 of the adhesive tape platform 12 may include a different number or configuration of sensors than is shown in FIG. 1F. Additionally, the segment 13 may include more than one coupling element 28, according to some embodiments. In this case, each coupling element 28 is coupled to at least one sensor in the wireless transducing circuit 14. In further embodiments, the segment 13 also includes more than one aperture 27, corresponding to the number of coupling elements 28.

In other embodiments, the segment 13 does not include a coupling element 28, and the aperture 27 instead directly exposes a sensor of the adhesive tape platform segment 13. The sensor makes direct physical contact with the surface of an object when the segment 13 is applied to the surface, according to some embodiments. In some embodiments, the sensor is exposed by the aperture 27, but the sensor does not touch the surface of the object when the segment 13 is applied to the surface. The exposed sensor may sense a property or energy from the surface without physically touching the surface, according to some embodiments. For example, the exposed sensor may be a light sensor that detects light from the surface.

Figure 2:
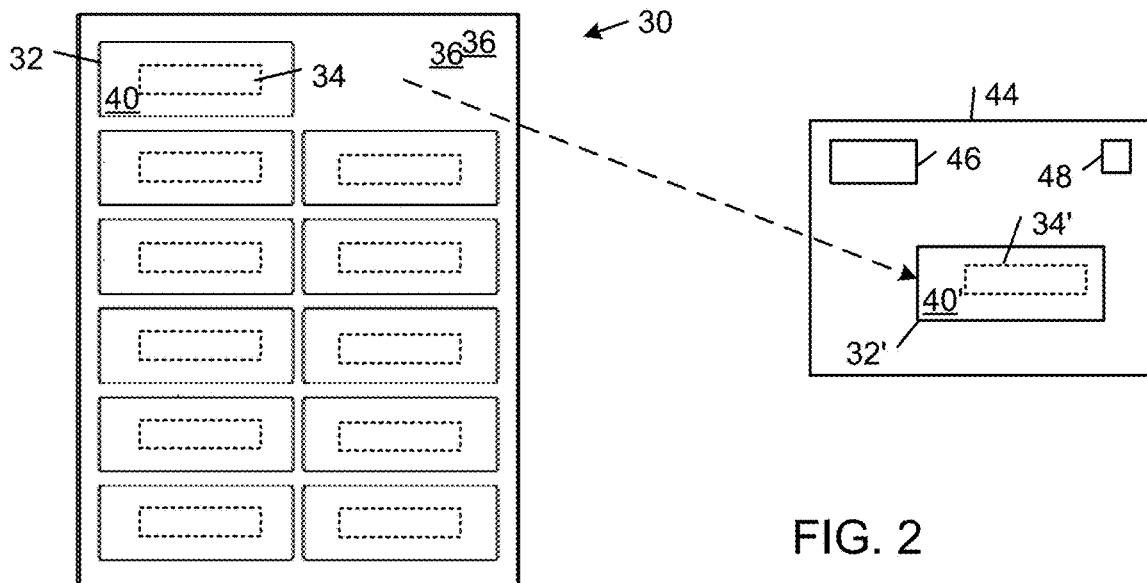
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
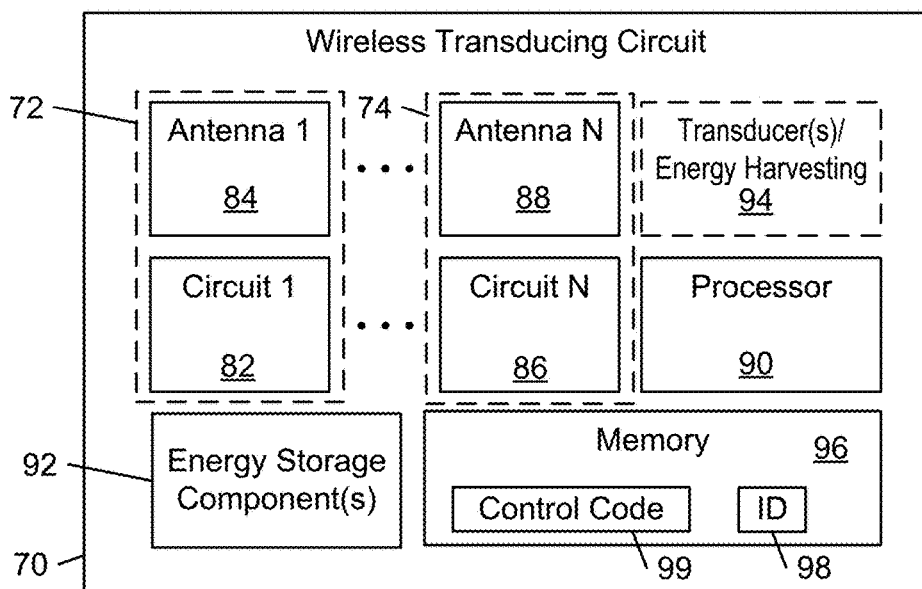
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
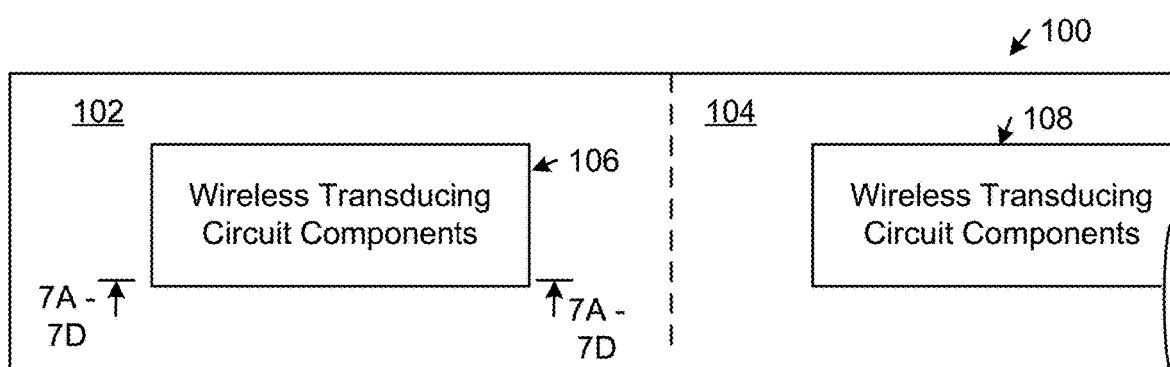
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
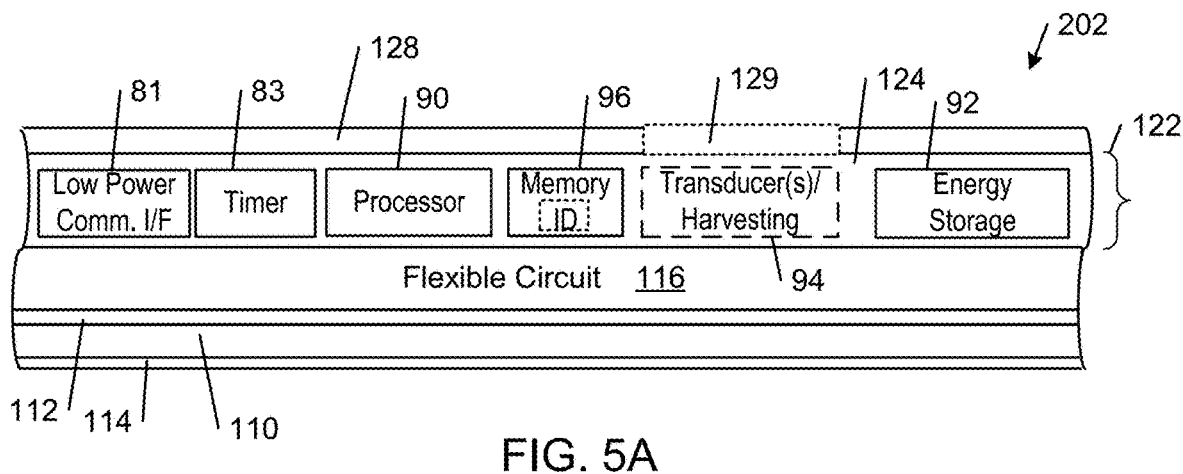
FIGS. 5A-5J show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
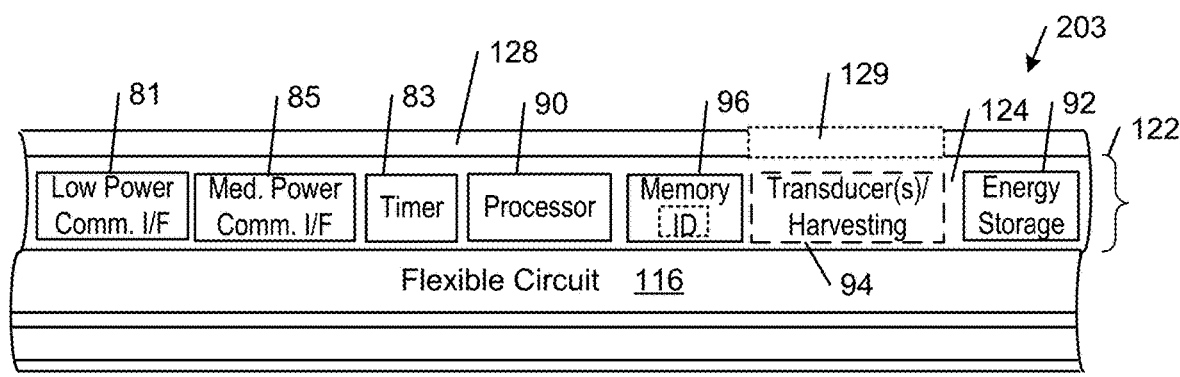

FIG. 5B shows a cross-sectional side view of a portion of an example segment 203 of the flexible adhesive tape platform 100 that includes a respective set of the components of the wireless transducing circuit 106 corresponding to the second tape node type (i.e., green). In this example, the flexible adhesive tape platform segment 203 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 203 differ, for example, in functionality or capacity (e.g., larger energy source).

Figure 5C:
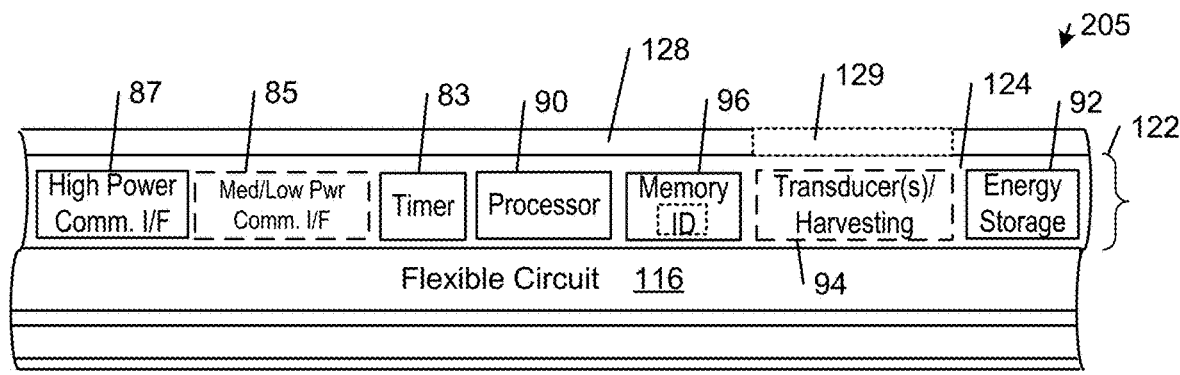

FIG. 5C shows a cross-sectional side view of a portion of an example segment 205 of the flexible adhesive tape platform 100 that includes a respective set of the components of the wireless transducing circuit 106 corresponding to the third tape node type (i.e., black). In this example, the flexible adhesive tape platform segment 205 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 205 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torquing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

When a segment (e.g., segment 202, 203, 205) of an adhesive tape platform is adhered to an object for monitoring properties of the object using the one or more sensors 94, the one or more sensors 94 are indirectly coupled to the object. In this case, the flexible circuit 116, the adhesive layer 112, the flexible substrate 110, and the adhesive layer 114 are intervening layers between the one or more sensors 94 and a surface of the object being monitored. The intervening layers may result in reduced coupling (thermal, mechanical, physical, etc.) between the one or more sensors 94 and the object being monitored. In the case of vibration sensing, where the one or more sensors 94 include vibration sensors, the intervening layers may dampen or otherwise interfere with vibrations being sensed by the one or more sensors 94. This reduces the ability of the segment 102 to sense vibrations. In other cases, where other properties or signals are being sensed, the intervening layers may similarly dampen or otherwise interfere with the sensing ability of the segment 102. For example, the intervening layers may absorb or disperse heat from the object being monitored, reducing the ability of a temperature sensor of the one or more sensors 94 to accurately measure the temperature of the object being monitored. Thus, example segments of the adhesive tape platform 100 discussed below with respect to FIGS. 5D-5J include embodiments of the coupling element 28 and the aperture 27 for enhanced mechanical and/or thermal coupling between the one or more sensors 94 and the object being measured by the adhesive tape platform 100.

Figure 5D:
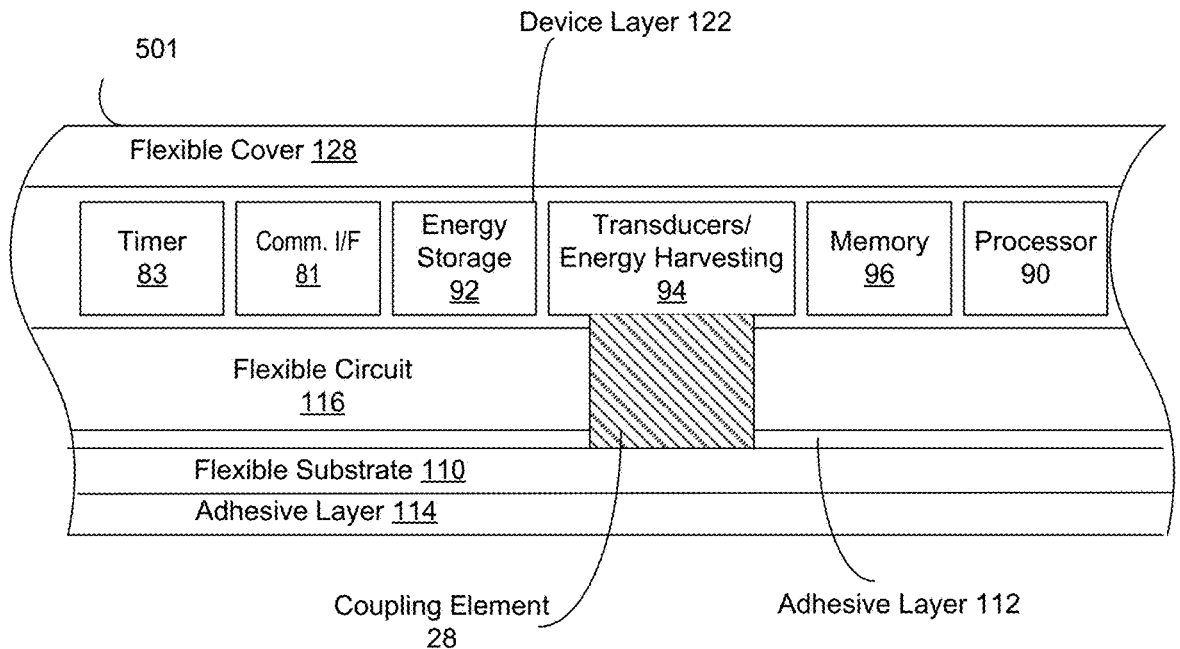

FIG. 5D shows a cross-sectional side view of a portion of an example segment 501 of an embodiment of the flexible adhesive tape platform 100 that includes a respective set of the components of the wireless transducing circuit 106 and a coupling element 28. The segment 501 includes the same components as the segment 102 shown in FIG. 5A and also includes a coupling element 28.

The coupling element 28 is positioned below the device layer 122, according to some embodiments. In other embodiments, the coupling element 28 is positioned above the device layer 122. For example, the coupling element 122 may be between the device layer 122 and the flexible cover 128 or may be in a same layer as the flexible cover 128. In the example of FIG. 5D, a top surface of the coupling element 28 mechanically couples to the one or more sensors 94 in the device layer 122. In some embodiments, the coupling element 28 directly contacts the one or more sensors 94, as shown in FIG. 4B. The bottom surface of the coupling element 28 couples (e.g., mechanically couples) to a surface of an object being monitored. In the example segment 501 shown in FIG. 5D, the bottom surface of the coupling element 28 indirectly couples to the object being monitored with intervening layers (e.g., the adhesive layer 114 and the flexible substrate 110) between the bottom surface of the coupling element 28 and the object.

The coupling element includes a material that transfers vibrations (i.e., mechanical energy) from the object to the one or more sensors 94 with minimal dampening, absorption or loss, according to some embodiments. In other embodiments, the coupling element transfers other types of energy, signals, or other properties to from the object to the one or more sensors 94. In this case, the coupling element may have a conductive property (e.g., electrical, thermal, or some other conductivity). In some embodiments, the coupling element 28 includes a material that has a higher stiffness than a material of the flexible substrate 110. For example, the coupling element 28 may include a material with a Young's modulus that is higher than a Young's modulus of a material of the flexible substrate 110. The coupling element 28 may include a material that has a higher stiffness than a material of the flexible cover 128, a material of the device layer 122, a material of the flexible circuit 116, a material of the adhesive layer 114, a material of the adhesive layer 112, or some combination thereof. In some examples, the coupling element 28 may include a rigid metal material. The coupling element 28 may include a stainless steel material, a copper material, a steel material, an aluminum material, a gold material, some other material, or some combination thereof.

According to some embodiments, the coupling element 28 may be bonded to a portion of the device layer 116 or the flexible circuit layer 116 by an adhesive (not shown). In some embodiments, the coupling element 28 is attached to the one or more sensors by using an epoxy to adhere the coupling element 28 to at least one of the sensors 94. In other embodiments, the coupling element 28 is soldered to a surface of at least one of the sensors 94. In some embodiments, an adhesive is used to attach the coupling element 28 to at least one of the sensors 94. In some embodiments the coupling element 28 is soldered to a portion of the flexible circuit 116 to affix the coupling element 28 in place. In some embodiments, the coupling element is affixed to its position in the tape node 501 by other methods not described above. In other embodiments, the coupling element 28 may be fastened to a portion of the adhesive tape platform by screws, bolts, or other fasteners.

According to some embodiments, the coupling element 28 may have a damping capacity that is lower than a damping capacity a material of the flexible cover 128, a material of the device layer 122, a material of the flexible circuit 116, a material of the adhesive layer 114, a material of the adhesive layer 112, or some combination thereof, for example. In cases where the adhesive tape platform is used to monitor temperature and one of the sensors 94 is a temperature sensor, the coupling element 28 is thermally conductive and thermally couples the temperature sensor in the wireless transducing circuit to the surface of the object being monitored. The coupling element 28 may have thermal conductivity that is higher than a thermal conductivity a material of the flexible cover 128, a material of the device layer 122, a material of the flexible circuit 116, a material of the adhesive layer 114, a material of the adhesive layer 112, or some combination thereof, for example. The coupling element 28 may have some other conductivity (e.g., electrical conductivity) that is higher than a conductivity (e.g., electrical conductivity) of a material of the flexible cover 128, a material of the device layer 122, a material of the flexible circuit 116, a material of the adhesive layer 114, a material of the adhesive layer 112, or some combination thereof, according to some embodiments.

The coupling element 28 forms a part of a pathway for transferring energy (e.g., vibrations, thermal energy, etc.) from the object being monitored to the one or more sensors 94, improving the ability of the segment 501 of the adhesive tape platform 100 to accurately sense vibrations and other properties from the object being monitored, compared to the example segments which do not include the coupling element 28 in the pathway. The coupling element 28 may compensate for dampening of vibrations that may occur in the intervening layers (e.g., the adhesive layer 114, the flexible substrate 110, the adhesive layer 112, and the flexible circuit 116). In some embodiments, the coupling element 28 compensates for thermal loss or other dampening of properties that can be measured by the one or more sensors 94 that occurs in the intervening layers.

Figure 5E:
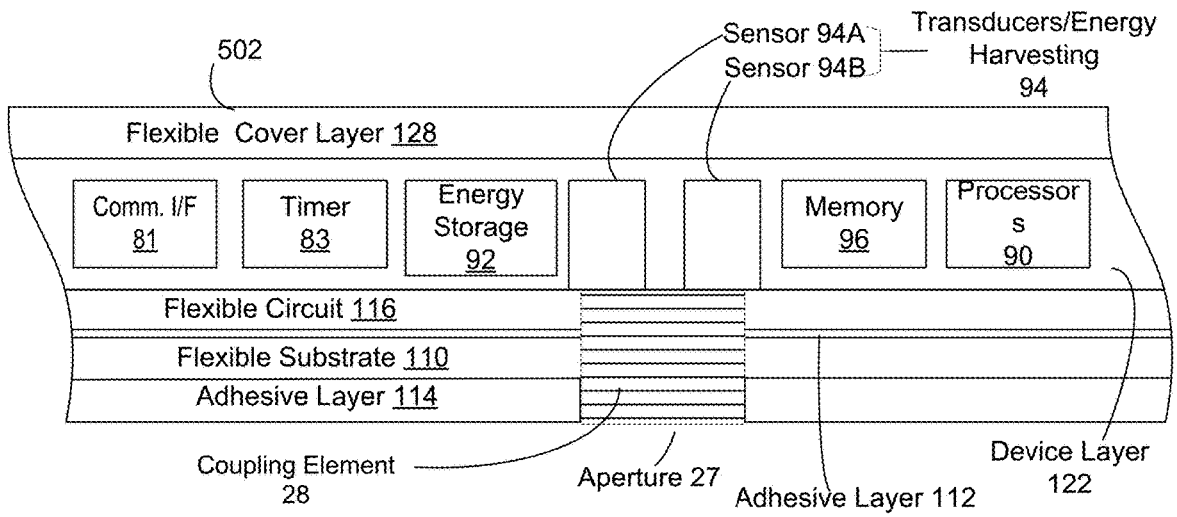

FIGS. 5E-5J illustrate alternate embodiments of a segment of the adhesive tape platform 100 with different configurations. FIG. 5E shows a cross-sectional side view of a portion of an example tape node 502 of the flexible adhesive tape platform 100 that includes a respective set of the components of the wireless transducing circuit 106. FIG. 5E shows an example tape node 502 of the adhesive tape platform 100 that includes the aperture 27 and the coupling element 28. The example tape node 502 includes the same components as the segment 501 shown in FIG. 5D and also includes the aperture 27 which exposes the coupling element 28, according to some embodiments.

The aperture 27 extends through the adhesive 114, the flexible substrate 110, the adhesive layer 112, and the flexible circuit 116. The aperture 27 may be formed by laser cutting, wet and/or dry etching, cutting with a blade or cutting apparatus, or some other method of forming an opening in a respective one or more layers. In some embodiments, the aperture 27 is formed in the substrate layer prior to assembly of the adhesive tape platform. The aperture 27 may include multiple openings in each of the adhesive 114, the flexible substrate 110, the adhesive layer 112, and the flexible circuit 116 that at least partially overlap. In other embodiments, the aperture 27 may be configured differently. As shown in the example of FIG. 0.5E, the coupling element 28 overlaps with the aperture 27. Due to the exposure of the coupling element 28 through the aperture 27, the bottom surface of the coupling element 28 makes direct contact with a surface of an object being monitored without any intervening layers, when the tape node 502 is adhered to the surface of the object. Since there are no intervening layers between the surface of the object and the coupling element 28, the coupling element 28 may more effectively transfer vibrations (or mechanical energy) from the object to the one or more sensors 94 (including the sensors 94A and 94B shown in FIG. 5A). In some embodiments, the adhesive layer 112 covers the bottom surface of the coupling element 28. In other embodiments, an adhesive is applied to the bottom surface of the coupling element 28 to enhance adhesion of the coupling element 28 to the surface of the object being monitored.

In some embodiments, the coupling element 28 includes a thermally conductive material. For example, the coupling element 28 may include a metal material that conducts heat (e.g., copper). In this case, the coupling element 28 thermally couples the one or more sensors 94 to the surface of the object being monitored. In applications that require temperature sensing, this allows for accurate sensing of heat and temperature without thermal absorption or loss by intervening layers.

In the example shown in FIG. 5E, the coupling element 28 extends through the aperture, with the bottom surface of the coupling element at a same height as a bottom surface of the flexible substrate 110. In other words, the bottom surface of the coupling element is flush with the bottom surface of the flexible substrate. In other embodiments, the coupling element may be positioned differently in the tape node 502. For example, the coupling element 28 may not extend through the entire aperture 27, with the bottom surface of the coupling element 28 at a different height from the bottom surface of the adhesive layer 114. Additionally, the tape node 502 may include more than one coupling element 28, according to some embodiments. The tape node 502 may also include more than one aperture 27 according to some embodiments.

In the example tape node 502 shown in FIG. 5E, the coupling element 28 forms a pathway for energy to transfer from the surface of the object being monitored with the tape node 502 to the sensors 94. In the example of vibration sensing, the coupling element 28 transfers vibrations from the surface of the object being monitored to one or more vibration sensors included in the sensors 94. In the example of temperature sensing, the coupling element 28 transfers thermal energy (i.e., heat) from the surface of the object being monitored to one or more temperature sensors included in the sensors 94. In other embodiments, other types of energy, properties, or signals may be transferred from the surface of the object being monitored to the sensors 94. In some embodiments, the coupling element 28 may enhance the sensing of electrical signals (i.e. current, voltage, capacitance, inductance). For example, the coupling element 28 may include an electrically conductive material, and the coupling element 28 may conduct electricity (current and voltage) from the surface of the object being monitored to one or more sensors 94. In other examples, the coupling element 28 may be coupled to a capacitive sensor of the one or more sensors 94.

Figure 5F:
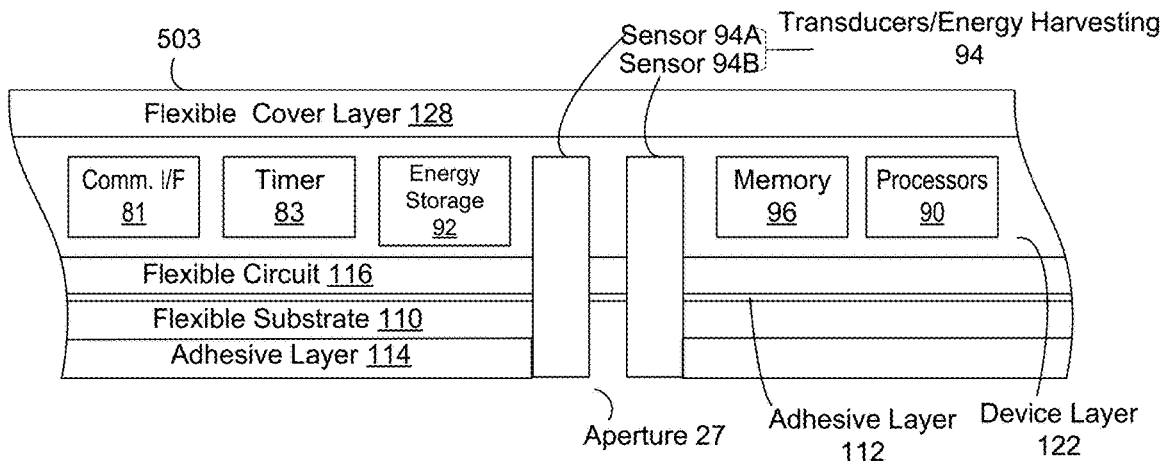

FIG. 5F shows a cross-sectional side view of a portion of an example segment 503 of the flexible adhesive tape platform 100 that includes a respective set of the components of the wireless transducing circuit 106. FIG. 5F shows an example segment 503 of the adhesive tape platform 100 that includes an embodiment of the aperture 27 but does not include the coupling element 28. The example segment 503 includes the same components as the segment 102 shown in FIG. 5A and also includes the aperture 27 which exposes the one or more sensors 94.

In the example of FIG. 5F, embodiments of the sensors 94 (including sensors 94A and 94B) in the segment 503 directly contact a surface of an object being measured, when the segment 503 is adhered to the surface of the object. Thus, the coupling element 28 does not intervene between the sensors 94 and the object when the segment 503 is applied to the surface of the object. This may improve the ability of the sensors 94 to sense vibrations from the object, in comparison to the tape node 501 which includes the coupling element 28, according to some embodiments. In some embodiments, if the sensors 94 include one or more temperature sensors, the configuration of the segment 503 shown in FIG. 5F may allow for more accurate sensing of the temperature at a surface of the object being measured, since the one or more temperature sensors can directly contact the surface of the object without any intervening layers. Although it is not shown in FIG. 5F, in some embodiments, the adhesive layer 114 covers the bottom surface of the sensors 94. In other embodiments, an adhesive is applied to the bottom surface of the sensors 94 to enhance the adhesion of the sensors 94 to the surface of the object being monitored.

Figure 5G:
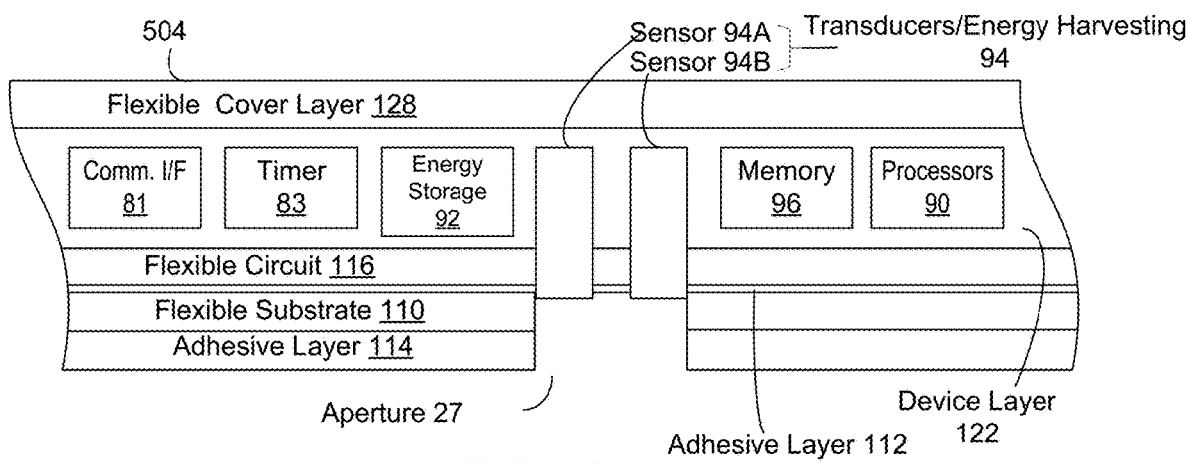

FIG. 5G shows a cross-sectional side view of a portion of an example segment 504 of the flexible adhesive tape platform 100 that includes a respective set of the components of the wireless transducing circuit 106 corresponding to the tape node. The example segment 504 includes the same components as the segment 503 shown in FIG. 5F, except that the one or more sensors 94 have a different configuration from that of the segment 503. As shown in FIG. 5G, the one or more sensors 94 do not extend through the aperture 27, with a bottom surface of the sensors 94 having a different height from a bottom surface of the flexible substrate 110.

Figure 5H:
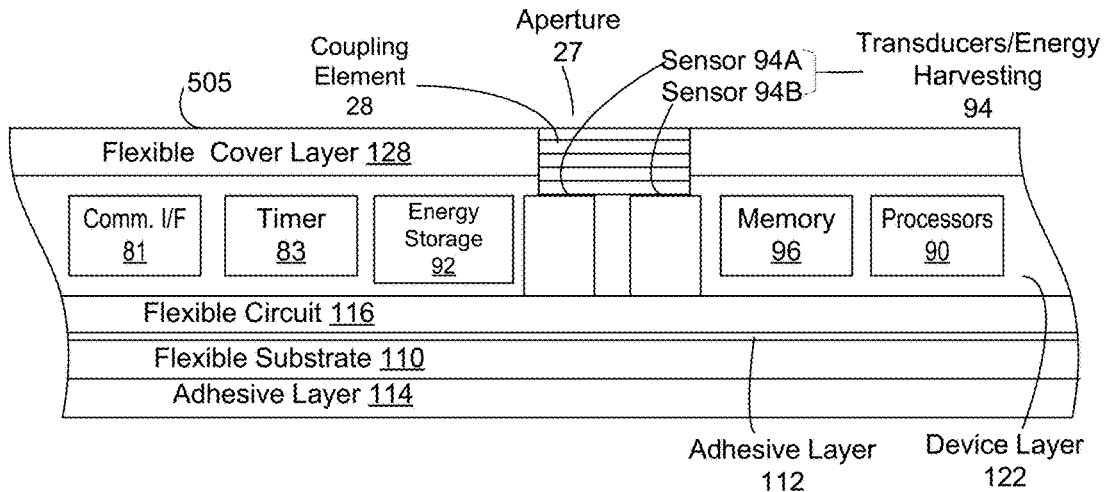

FIG. 5H shows a cross-sectional side view of a portion of an example segment 505 of the flexible adhesive tape platform 100 that includes a respective set of the components of the wireless transducing circuit 106 corresponding to the tape node. FIG. 5H shows an example tape node 505 that is an alternate embodiment of the example tape node 501 shown in FIG. 5D that includes the aperture 27 and the coupling element 28. In the example tape node 505, the coupling element is positioned above the sensors 94 and is exposed by the aperture 27 which is included in the flexible cover layer 128 instead of the flexible substrate 110. In this case, the coupling element 28 forms a pathway for vibration (or other forms of energy/signals) from an object of interest to the sensors 94 when the top surface of the flexible cover layer 128 is in contact with a surface of the object of interest. In some embodiments, an optional adhesive layer is on the flexible cover layer, allowing the top surface of the segment 505 to adhere to a surface of an object for monitoring the object with the sensors 94.

Figure 5I:
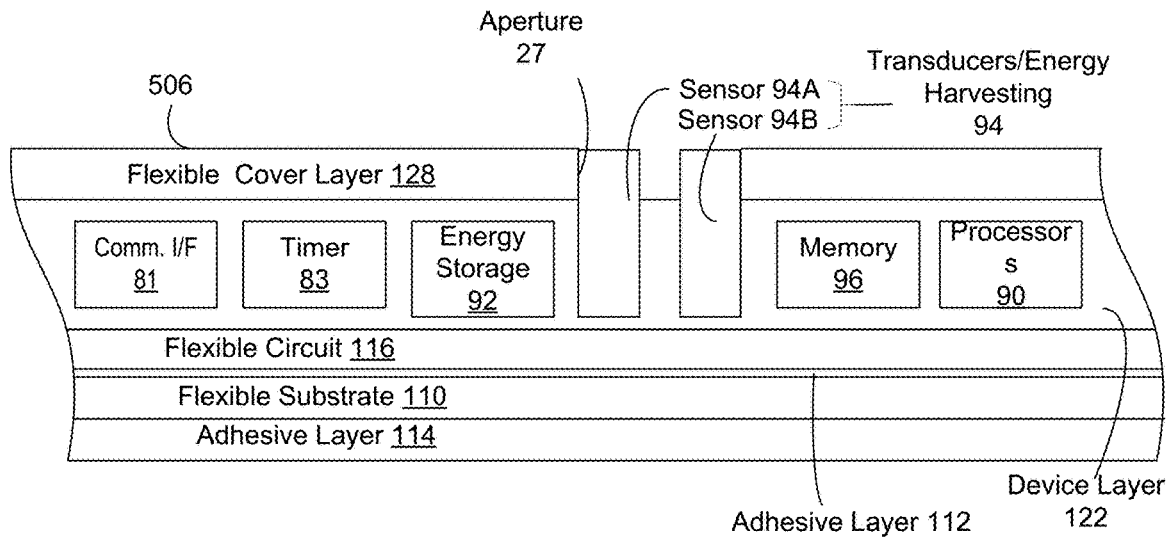

FIG. 5I shows a cross-sectional side view of a portion of an example segment 506 of the flexible adhesive tape platform 100 that includes a respective set of the components of the wireless transducing circuit 106. FIG. 5I shows an example tape node 506 that is an alternate embodiment of the example tape node 503 shown in FIG. 5F that includes an embodiment of the aperture 27 but does not include the coupling element 28. In the example tape node 506, the aperture 27 is in the flexible cover layer 128, not the flexible substrate 110. The aperture 27 exposes a top surface of one or more sensors 94 in the device layer 122, similarly to the tape node 504 shown in FIG. 5G. In the example shown in FIG. 5I, the sensors 94 directly contact a surface of an object of interest when the top surface of the flexible cover 128 is in contact with a surface of the object of interest. While the sensors 94 are shown to have a top surface flush with a top surface of the flexible cover layer 128, in other embodiments, this is not so.

Figure 5J:
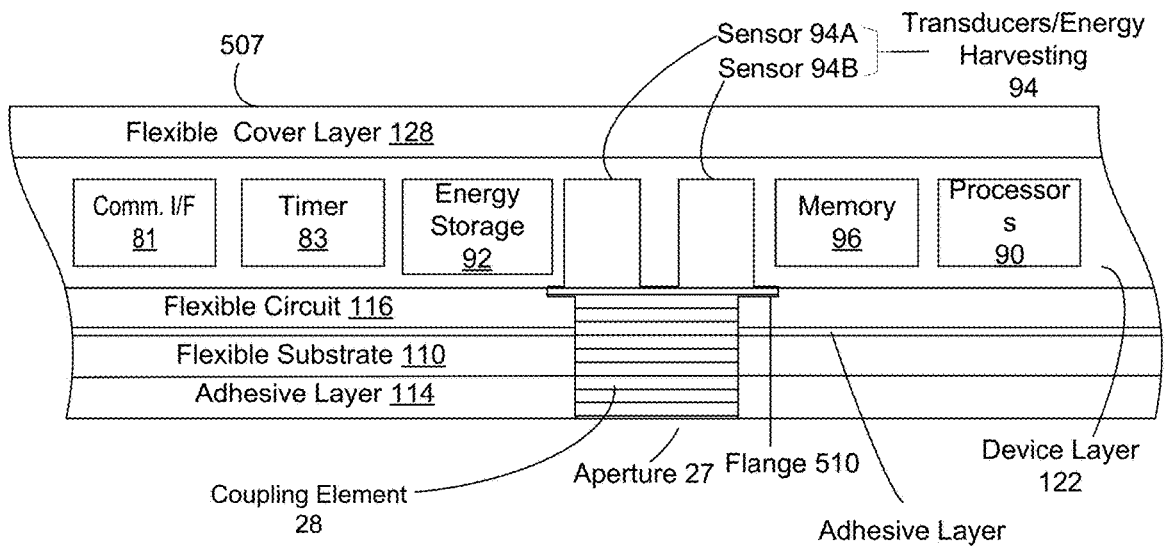

FIG. 5J shows a cross-sectional side view of a portion of an example segment 507 of the flexible adhesive tape platform 100 that includes a respective set of the components of the wireless transducing circuit 106. FIG. 5F shows an example tape node 507 that is an alternate embodiment of the example tape node 502 shown in FIG. 5E that includes the aperture 27 and the coupling element 28. In this embodiment, the coupling element 28 includes a flange 510 which is wider than another portion (e.g., the main portion) of the coupling element 28. The flange 510 may assist the coupling element 28 in staying in place in the aperture 27. In some embodiments, portions of the flange 510 may have an adhesive on the portions to secure the coupling element 28 to a part of the adhesive tape platform. In some embodiments, the flange may be secured to one or more of the flexible circuit 116, the device layer 122, and other portions of the segment 507 by an epoxy, solder, screws, bolts, or other fasteners. Portions of the flange 510 may include through holes or tapped holes for fastening the flange 510 to the adhesive tape platform using screws or bolts, according to some embodiments. In other embodiments, portions of the flange may be soldered to a portion of the flexible circuit 116 or the device layer 122.

While the examples shown in FIGS. 5A-5J only include the adhesive layer 114 on the bottom surface of the flexible substrate 110, in other embodiments, an additional adhesive layer is on the top surface of the flexible cover 128. In this case, the tape node acts as a double-sided adhesive tape. The tape node may then be adhered to first surface on the bottom side of the tape node and adhered to a second surface on the top side of the tape node. Each of the example tape nodes 501, 501, 502, 503, 504, 505, 506 may optionally have this double-sided adhesive tape configuration, according to some embodiments.

Figure 6A:
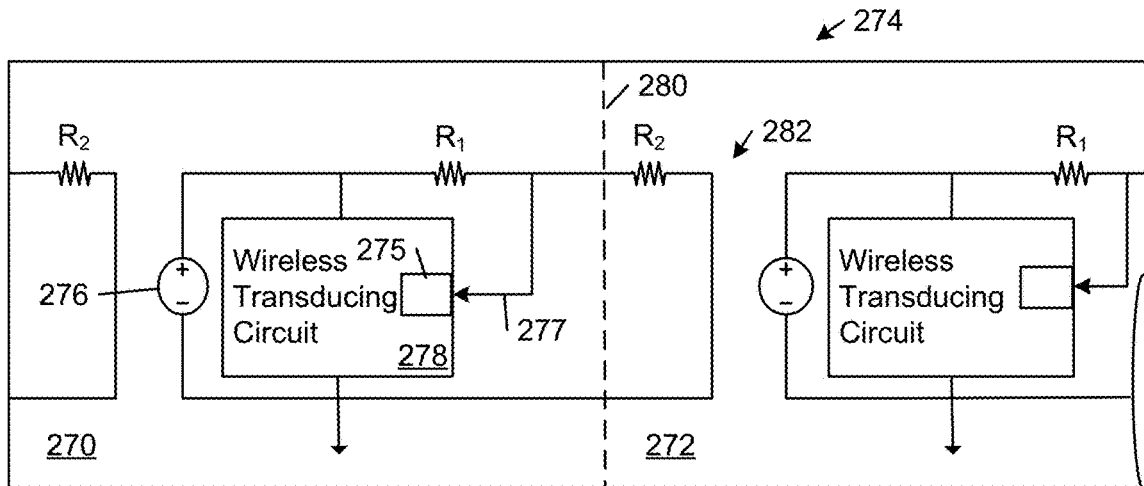
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
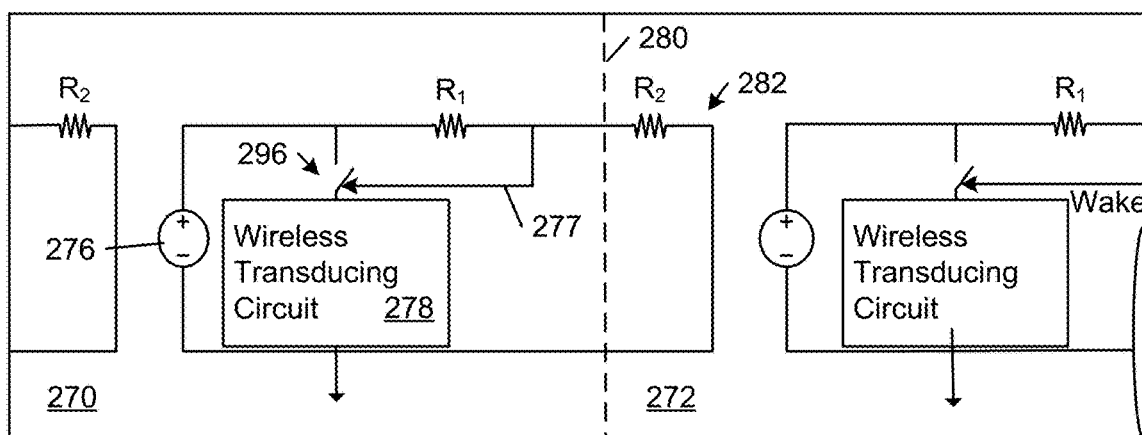

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
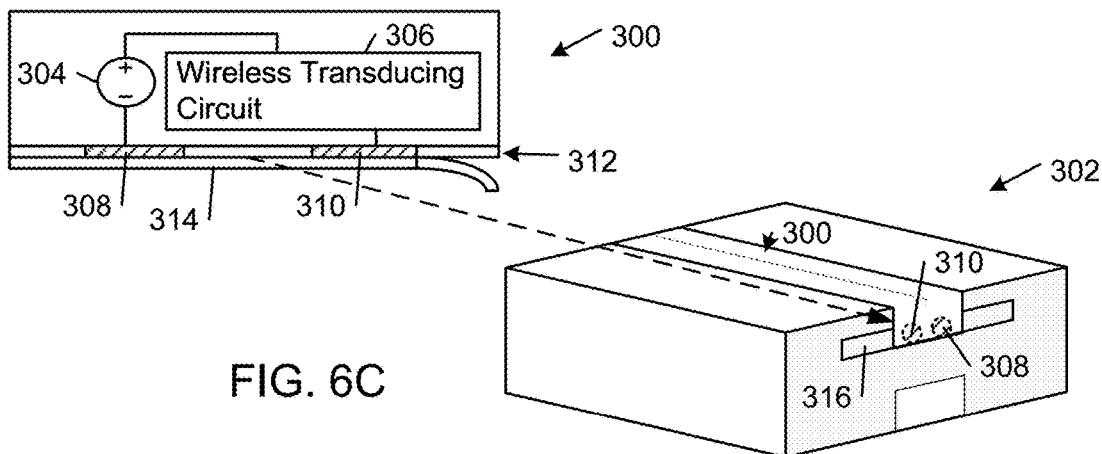
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
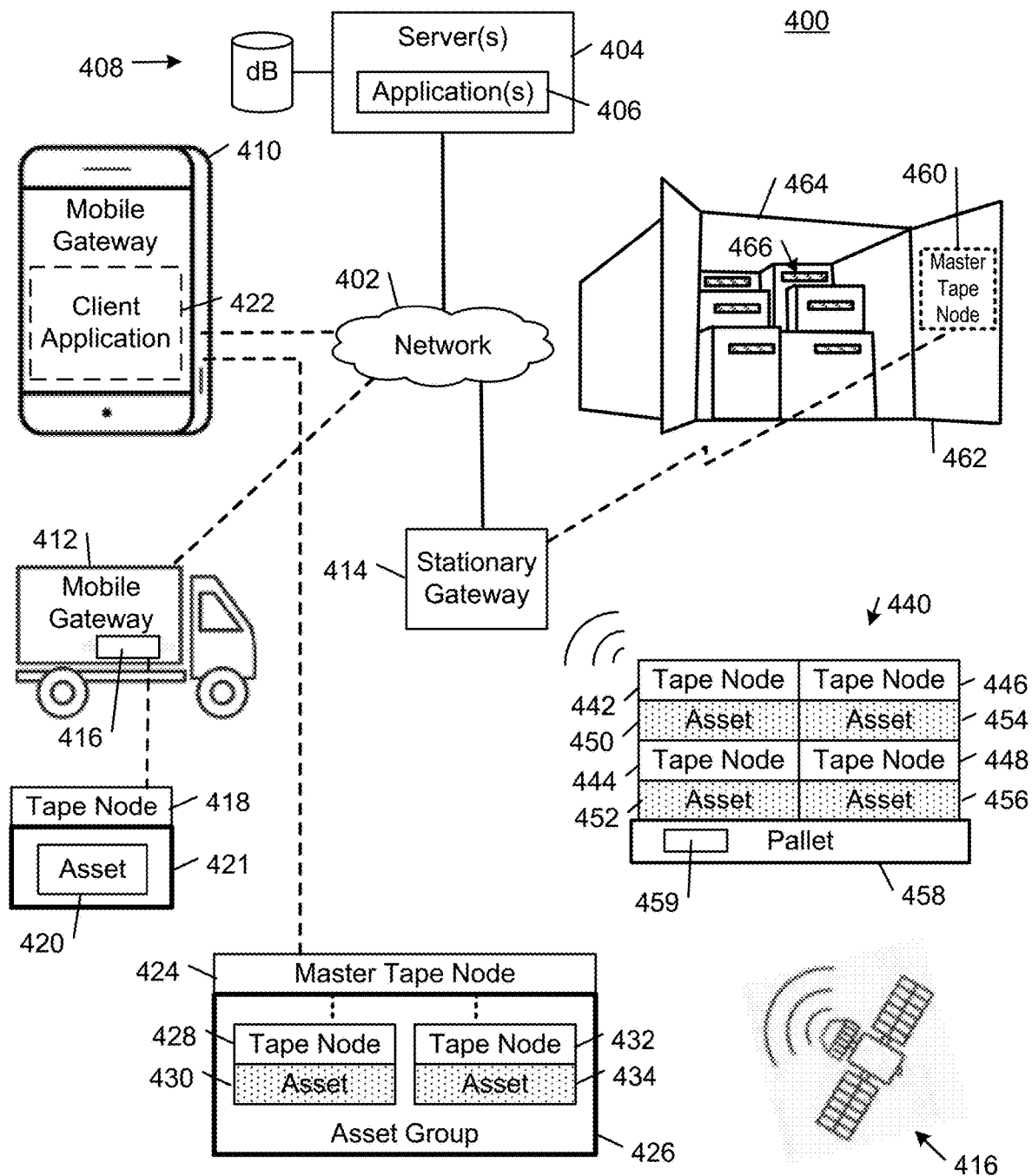
FIG. 7 is a diagrammatic view of an example of a network environment supporting communications with segments of an adhesive tape platform, according to some embodiments.

FIG. 7 shows an example network communications environment 400 (also referred to herein as an "IOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 203 or tape node 205, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 203, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 203 or tape node 205, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 203, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
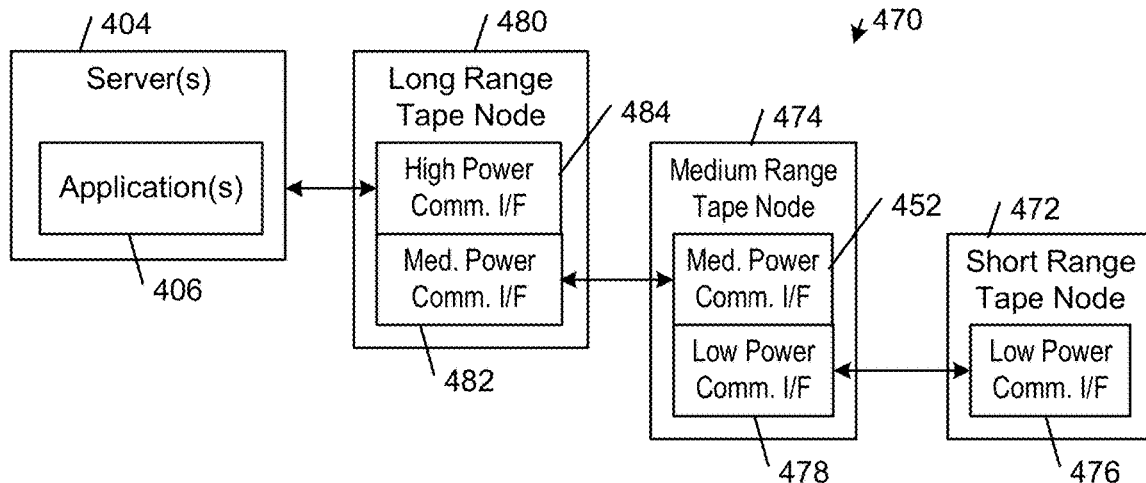
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
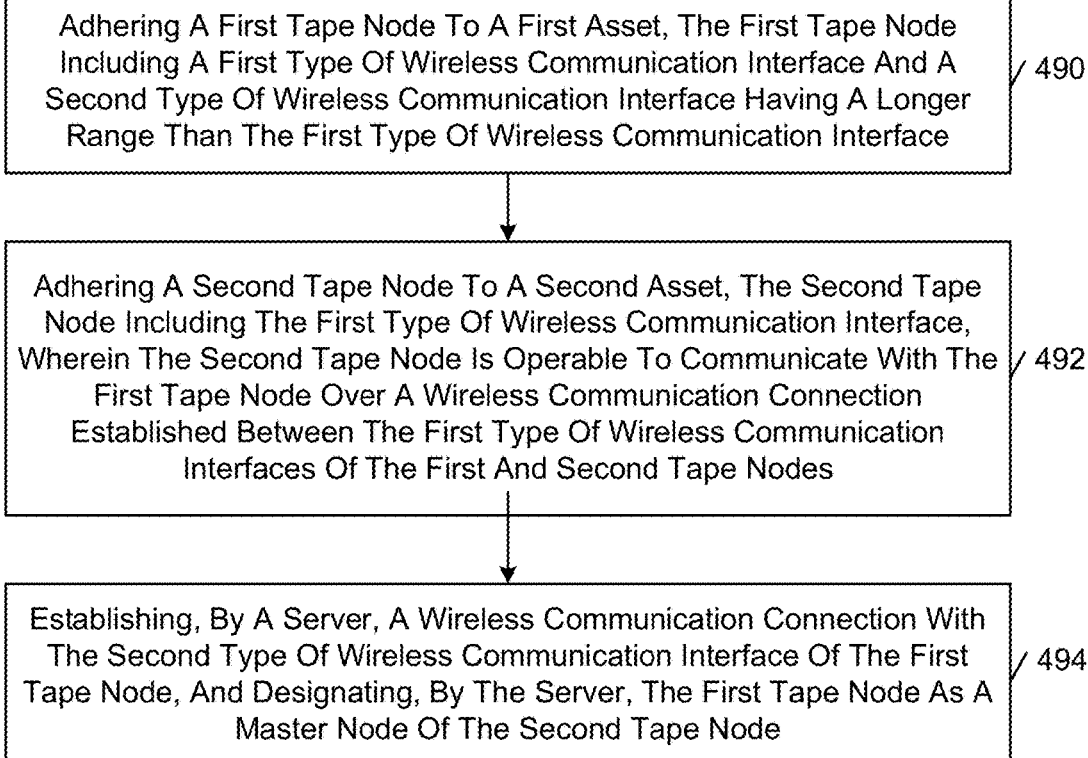
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
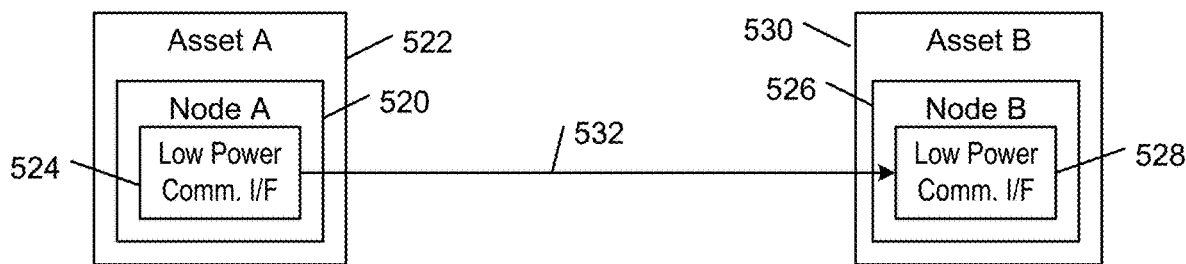
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
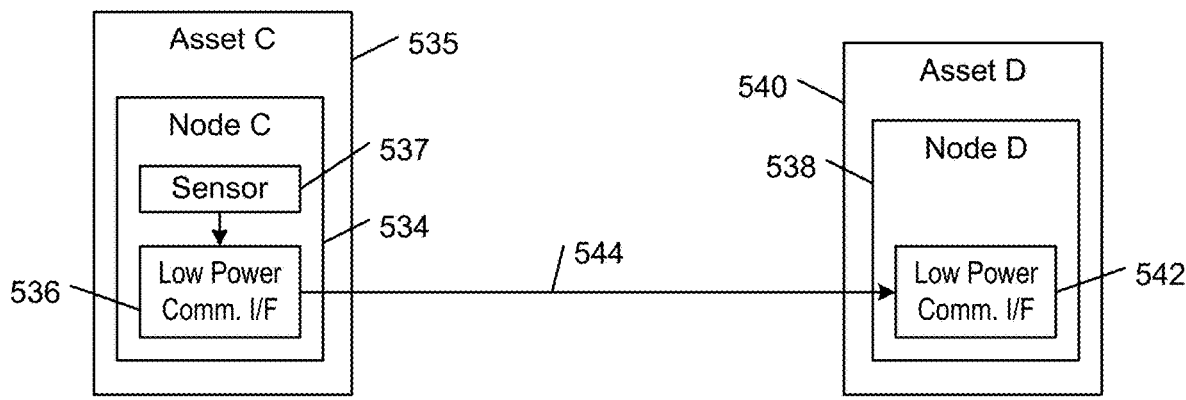

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
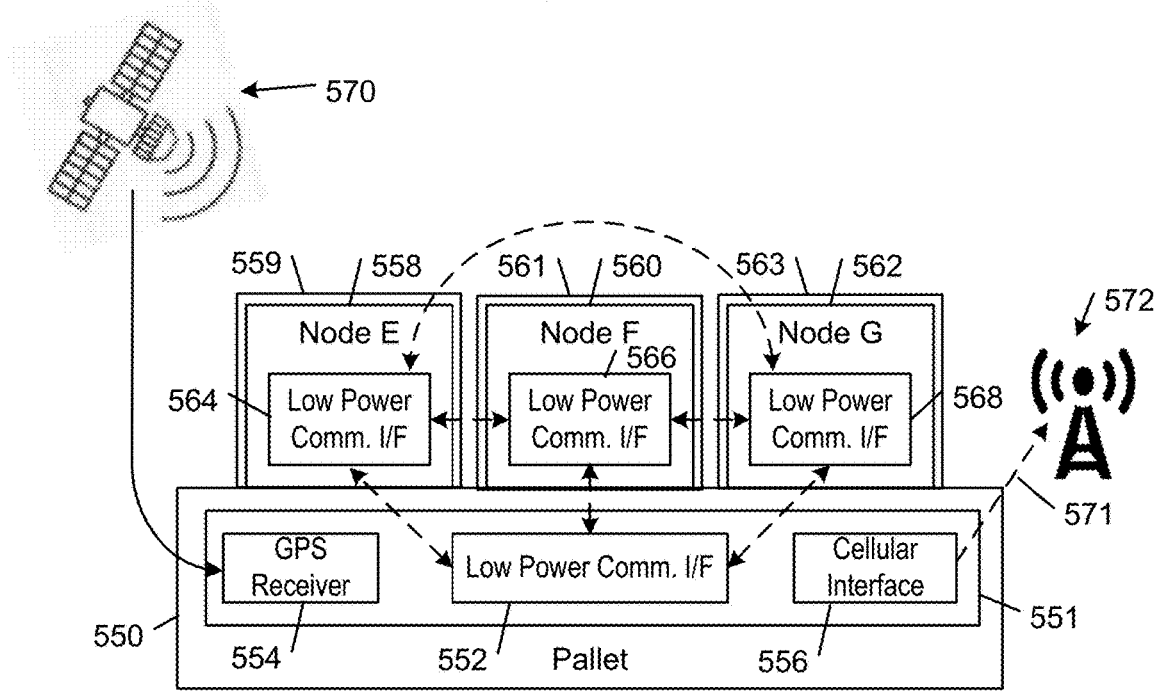

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
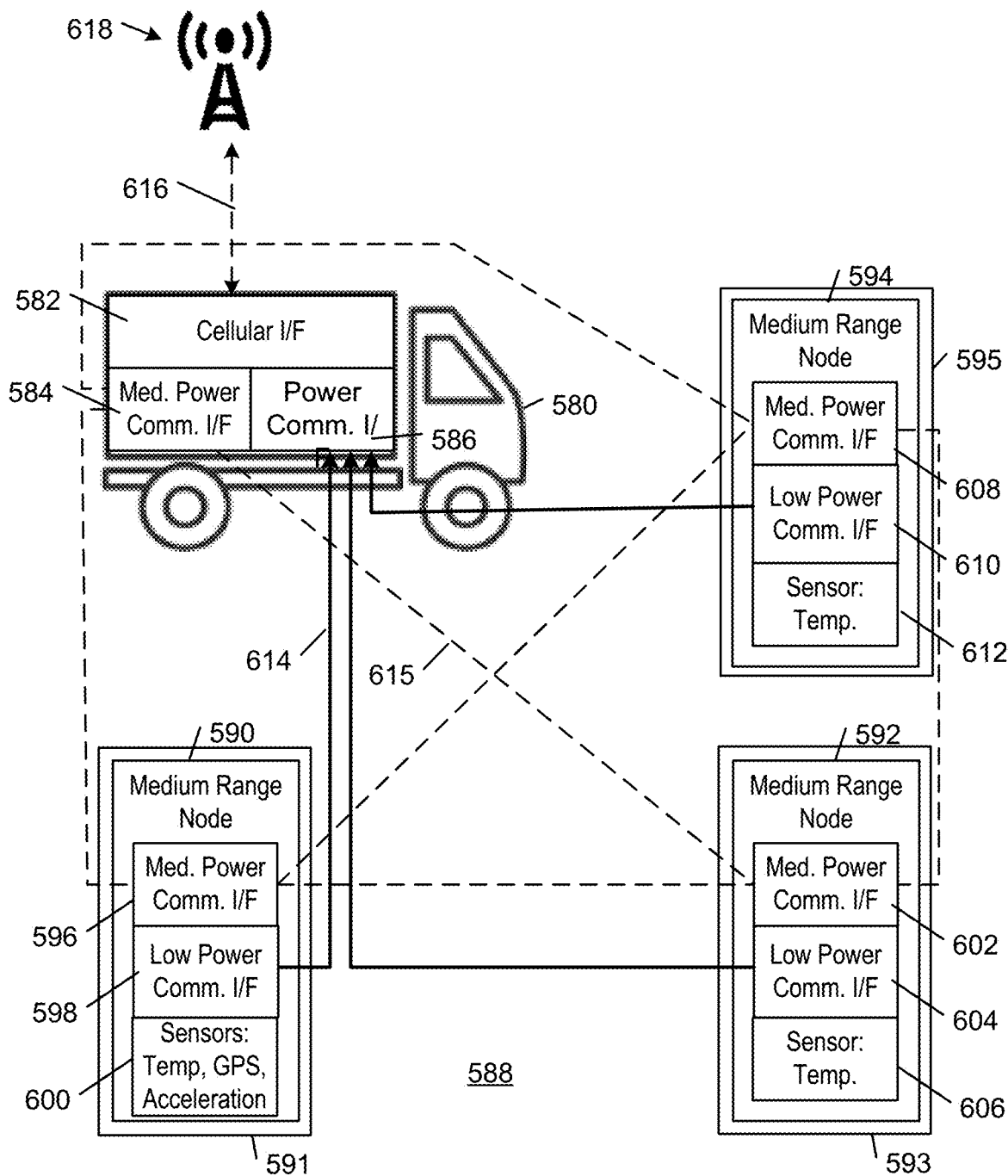

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
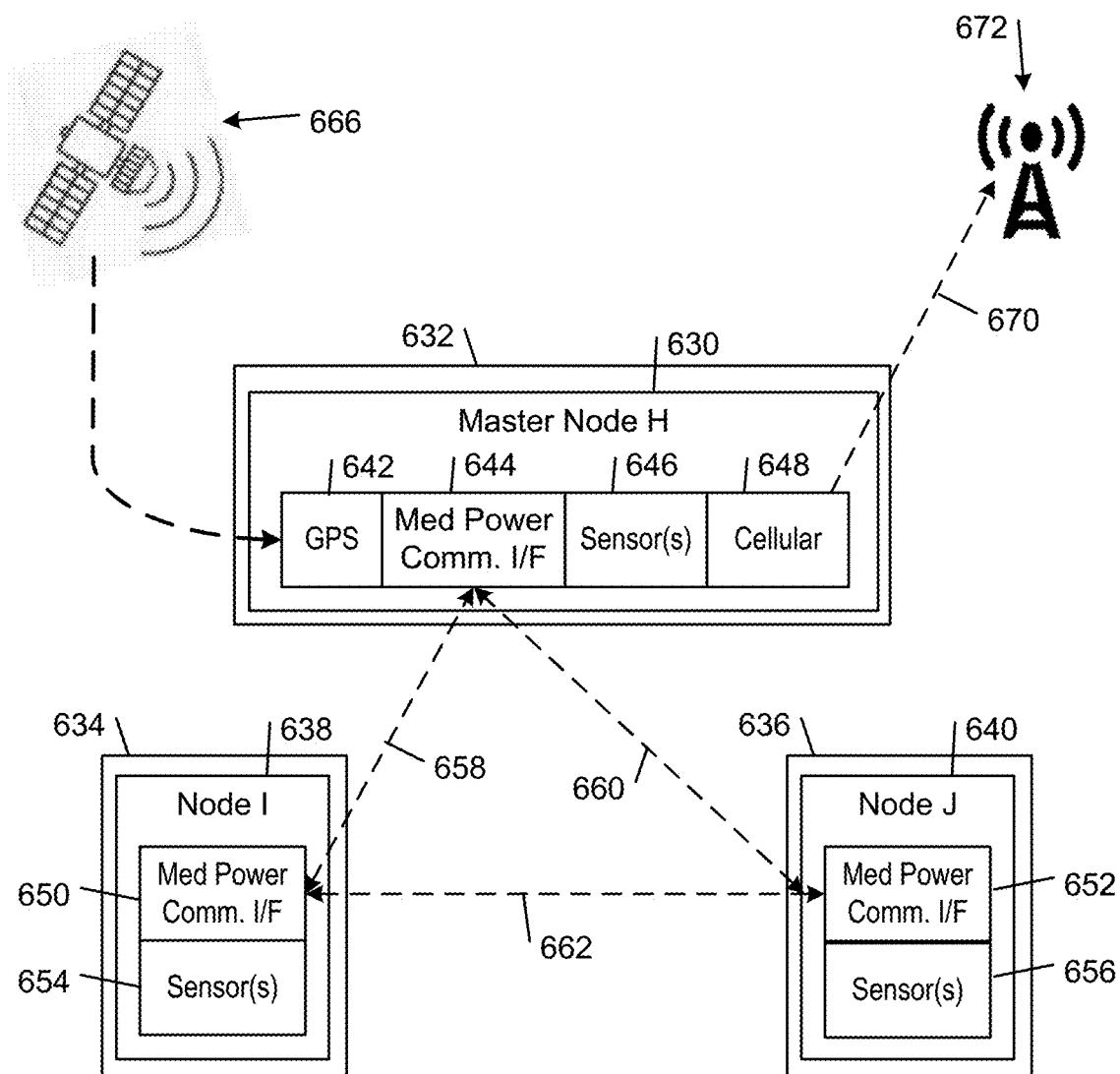

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Vibration and Temperature Monitoring

Embodiments of the adhesive tape platform shown in FIGS. 5A-5J may be used in some applications for vibration and temperature monitoring, according to some embodiments. In this case, a tape node may include at least one of a vibration sensor and a temperatures sensor. In some embodiments, each tape node includes both a vibration sensor and a temperature sensor. In other embodiments, a first tape node including a vibration sensor is used to measure vibrations and a second tape node including a temperature sensor is used to measure temperature. The first tape node and second tape node may be installed on an item of interest in proximity to each other, in some examples. In other examples, the first tape node and the second tape node may be installed at different positions on the item of interest. The IOT system 400 including the adhesive tape platform for vibration and temperature monitoring may receive communications from the tape nodes that include vibration and temperature sensor data. In some embodiments, a tape node includes intelligent software that is configured to determine when to transmit sensor data to a server or the cloud of the IOT system 400. For example, the tape node may include intelligent software stored on a memory of the tape node and executed by its processor that determines acceptable threshold ranges for the temperature and vibration measurements taken by the sensors of the tape node. If the tape node measures a temperature or vibration outside of the threshold range, the tape node transmits an alert to another wireless node (e.g., a gateway device, another tape node, a client device, or a server). The alert may include instructions to relay data included in the alert to a server or the cloud of the IOT system 400. The intelligent software allows for a respective tape node to conserve its battery and other resources by limiting wireless communications of sensing data to critical events, moments, and conditions for the asset or object being monitored. The intelligent software of the tape node may be part of a distributed intelligent software network that is distributed over the wireless nodes of the IOT system.

Figure 11A:
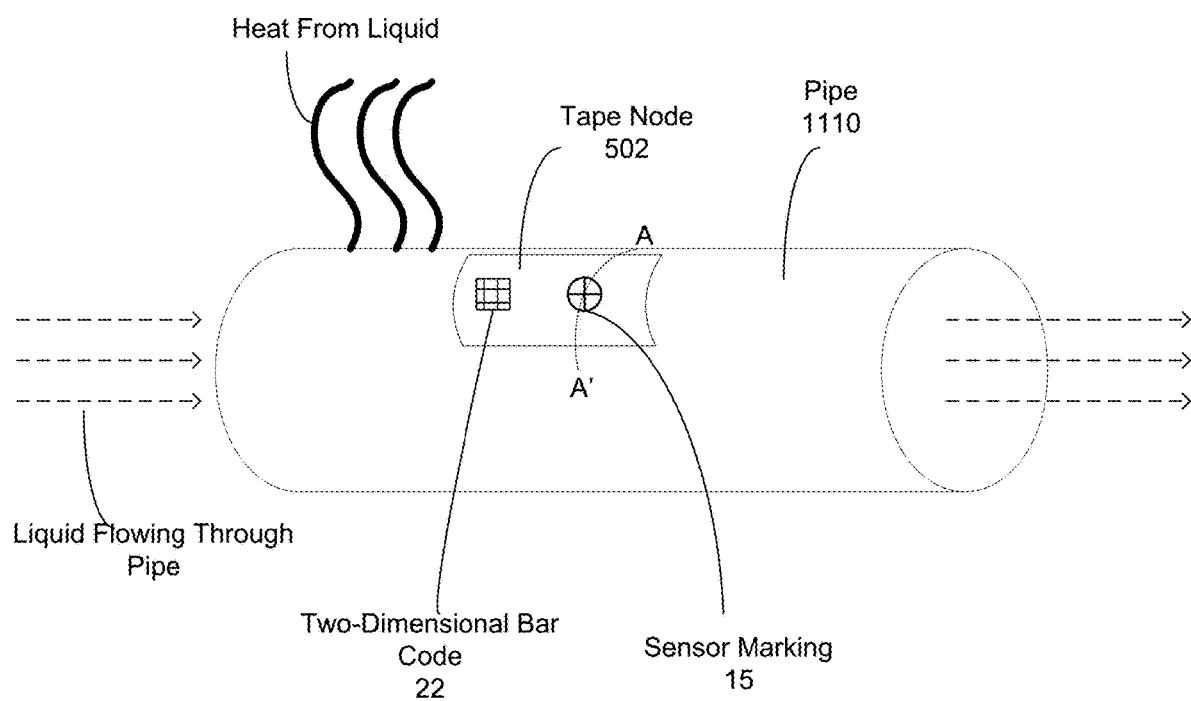
FIGS. 11A-11B shows example diagrams of an adhesive tape platform being used for vibration and temperature monitoring of a section of a pipe, according to some embodiments.

FIG. 11A is a diagram showing an example of a tape node being used for vibration and temperature monitoring of a section of a pipe. In the example of FIG. 11A, an embodiment of the tape node 502 of the adhesive tape platform is adhered to a section of a pipe 1110 that has a liquid flowing through it. The liquid may be hot or may transfer heat to the pipe, in some cases. The vibration of the section of the pipe 1110 is monitored in order to determine a flow rate of the liquid flowing through the pipe 502, in some embodiments. In some cases, the vibration monitoring may be used to determine additional and/or alternate properties besides flow rate of a liquid through the pipe 1110.

A non-adhesive side of the tape node 502 is shown in FIG. 11A, including the two-dimensional bar code 22 that appears on the adhesive side of the tape node 502 and the sensor marking 15. The sensor marking 15 indicates the position of the rigid element 28 and the one or more sensors 94 coupled to the rigid element 28 that are included in the tape node 502, according to some embodiments. In other embodiments, the tape node 502 does not include the sensor marking 15.

In the example shown in FIG. 11A, the tape node 502 (also referred to as a segment, herein) includes at least one vibration sensor and at least one temperature sensor. In other embodiments, the tape node 502 includes different configurations of sensors, types of sensors, number of sensors, or some combination thereof. For example, the tape node 502 may only include a vibration sensor for applications where only vibration sensing is relevant. In another example, the tape node 502 includes a vibration sensor for vibration sensing and another tape node including a temperature sensor is adhered at a different position on the section of the pipe 1110 for temperature sensing. In other embodiments, other configurations of tape nodes may be used, including a different number of tape nodes, different placements of the tape nodes, different types of tape nodes, or some combinations thereof.

The tape node 502 is configured to wirelessly communicate with other wireless nodes of the IOT system 400. In some cases, the tape node 502 is configured to transmits sensing data collected by its sensors, including data used to monitor vibrations and temperature, to other wireless nodes of the IOT system 400. In cases where the tape node 502 includes long-range wireless communication capabilities, the tape node 502 may directly communicate with a central database and control system to send sensor data and alerts. In other embodiments, the tape node 502 transmits the sensor data and notifications over short range wireless communications to another wireless node (e.g., another tape node, a gateway device, or a client device) which relays the received data and notifications through the IOT system 400 up to a server or cloud of the IOT system 400. The cloud may include a central database and control system which coordinates communications and provides and receives instructions to and from the one or more wireless nodes of the IOT system, including one or more sensor tape nodes. In some embodiments, the tape node 502 also transmits sensing data to one or more client devices. A client device may be used to scan the two-dimensional bar code 22. This may be done to register the tape node 502 in a log or database, initialize the tape node 502, pair the tape node 502 with the client device, for other functions, or some combination thereof. The client device may register data on the tape node 502 to the database including information such as the location of the tape node, an identifier for an object that the tape node 502 is attached to, a battery life of the tape node 502, a list identifying the components and capabilities of the tape node 502, a firmware version of the tape node 502, and other data. The data may be based on input from a user of the client device or it may be automatically determined based on data that the client device collects, such as the location of the client device based on cellular or GPS positioning.

The tape node 502 measures vibrations of the section of the pipe 1110 using a vibration sensor (which may be a component of the wireless transducing circuits discussed above), according to some embodiments. The vibration sensor may use one or more of the following sensors to measure vibrations: an accelerometer (piezoelectric-based accelerometer, capacitive-based accelerometer, piezoresistive accelerometer, MEMS-based accelerometer, MEMS resonant accelerometer), a strain Gauge, a velocity sensor, a microphone or acoustic pressure sensor, an optical or laser based vibration sensor, and other types of vibration sensors. Vibrations may be monitored using vibration sensing data including acceleration data, velocity data, displacement data, acoustic pressure (e.g., audio) data, other data relevant to calculating the vibration, or some combination thereof.

Figure 11B:
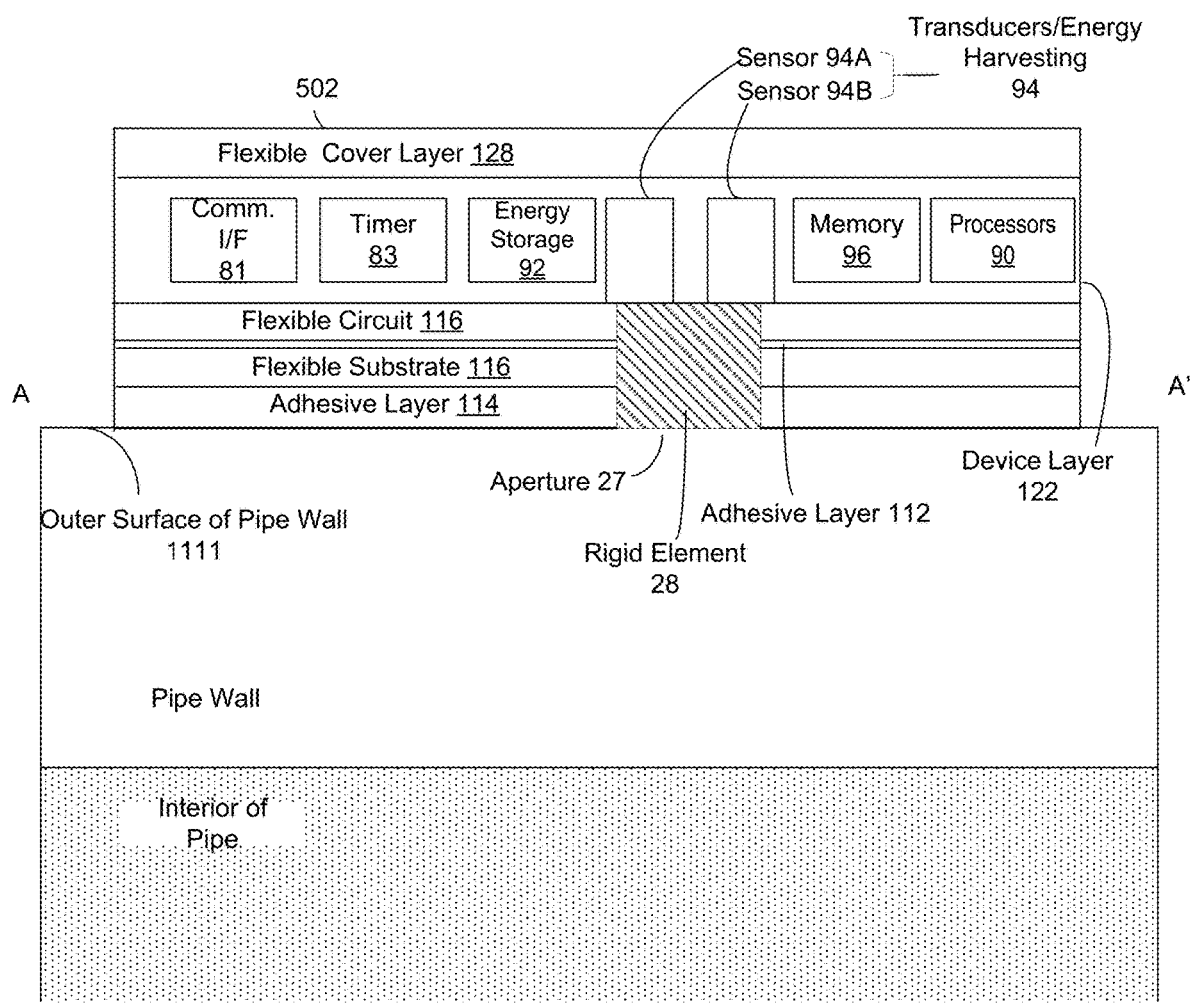

FIG. 11B shows a diagram representing a cross-section of the tape node 502 and the section of the pipe 1110 along the curve A-A'. Since the tape node 502 has a flexible form factor, it easily conforms to an outer surface of the pipe wall 611 without the need for a complicated installation (e.g., using epoxy or additional hardware). A bottom surface of the rigid element 28 directly contacts an outer surface of the pipe wall 611, mechanically and thermally coupling the outer surface of the pipe wall 611 to the sensors 94. The rigid element 28 allows for the transmission of vibrations and heat from the pipe wall to the sensors 94A and 94B with minimal loss.

In other embodiments, where the example segment 502 (shown in FIG. 5B) is adhered to pipe 1110 and is used instead of the example tape node 502, the sensors 94A and 94B directly contact the outer surface of the pipe wall 611 without the rigid element 28 intervening. In some cases, this may provide preferable mechanical and/or thermal coupling to the pipe 1110.

The distributed intelligent software may include rules, protocols, logic, and/or instructions for one or more of the nodes (including wireless sensor nodes and wireless nodes), the central database and control system, and the client devices in various scenarios. The distributed intelligent software instructs the wireless sensor nodes to enter different states based on the rules and based on the sensing data collected by the wireless sensor nodes.

The states may include, but are not limited to the following examples: a low power mode where the tape node operates with minimal power consumption; a low communication mode where the tape node limits the amount of transmitted/received data and/or frequency of transmitting and receiving data; a high communication mode where the tape node increases the amount of transmitted/received data and/or frequency of transmitting and receiving data; a sensing mode in which sensors included in the tape node collect sensor data, and the sensor data is transmitted to members of the sensing system 500; a no-sensing mode in which sensors included in the tape node are deactivated and do not collect sensor data; a low sensing mode which limits the amount of sensor data collected and transmitted (in some embodiments, this includes decreasing the sampling frequency of the sensors and frequency of transmitting the sensor data); a high sensing mode which increases the amount of sensor data collected and transmitted. (in some embodiments, this includes increasing the sampling frequency of the sensors and frequency of transmitting the sensor data); a sensor configuration mode where a configuration or property of a sensor in the tape node is changed; a sensor activation mode where a specific set of sensors in the tape node are activated (e.g., if a tape node has an acoustic sensor, an accelerometer, and an optical sensor, activating the operation of the accelerometer and the acoustic sensor (e.g., in response to the optical sensor detecting an above threshold value)); a search mode where the tape node searches for a client device in proximity of the tape node to communicate with; a heartbeat mode where the tape node intermittently transmits a signal to the central database and control system to indicate normal functionality of the tape node; an alert mode where the tape node transmits an alert to the central database and control system, a client device of a delivery employee (handler), a client device of a customer, a client device of a final recipient, a client device of an administrator, or some combination thereof; a data processing mode where the tape node calculates values (RMS values, peak values, spectrum analysis, fast Fourier transform (FFT) of data, peak frequency, a time stamp, a relative time a value is reached for a measurement, or other calculated values) based on collected sensing data and only transmits the calculated values a spectral band mode where the tape node collects measurements (e.g., vibration data) and/or calculates values in the form of a spectrum (e.g., a frequency spectrum) but only transmits a portion of the spectrum (e.g., data in a frequency band that is smaller than the full range of frequency-domain data that is collected); a full spectrum mode where the tape node collects measurements (e.g., vibration data) and/or calculates values in the form of a spectrum (e.g., a range of frequencies, a range of times, etc. . . . ) and transmits the entire spectrum; a full data mode where the tape node transmits all the sensing data that it has collected; a data history mode where the tape node transmits historical sensing data that it has stored in the memory of the tape node; a high fidelity location mode which increases the resolution and accuracy of location data that is collected and transmitted to the central database and control system (in some embodiments, this includes increasing the sampling frequency of location data and/or the frequency of transmitting the location data, and in other embodiments, this includes activating a GPS module on the tape node and collecting GPS-based location data); a low fidelity location mode which reduces the resolution and accuracy of location data that is collected and transmitted to the central database and control system (in some embodiments, this includes decreasing the sampling frequency of location data and/or the frequency of transmitting the location data and in other embodiments, this includes deactivating a GPS module on the tape node and omitting GPS data in the sensing data, while the tape node is in this mode); and an airplane mode where some of the wireless communication is deactivated based on air travel regulation. The states that the tape node can enter may include additional and/or alternate states not listed above. The tape node may be in multiple states simultaneously, according to some embodiments. For example, the tape node may be in both a high sensing mode and a high communication mode, as described above.

Figure 11C:
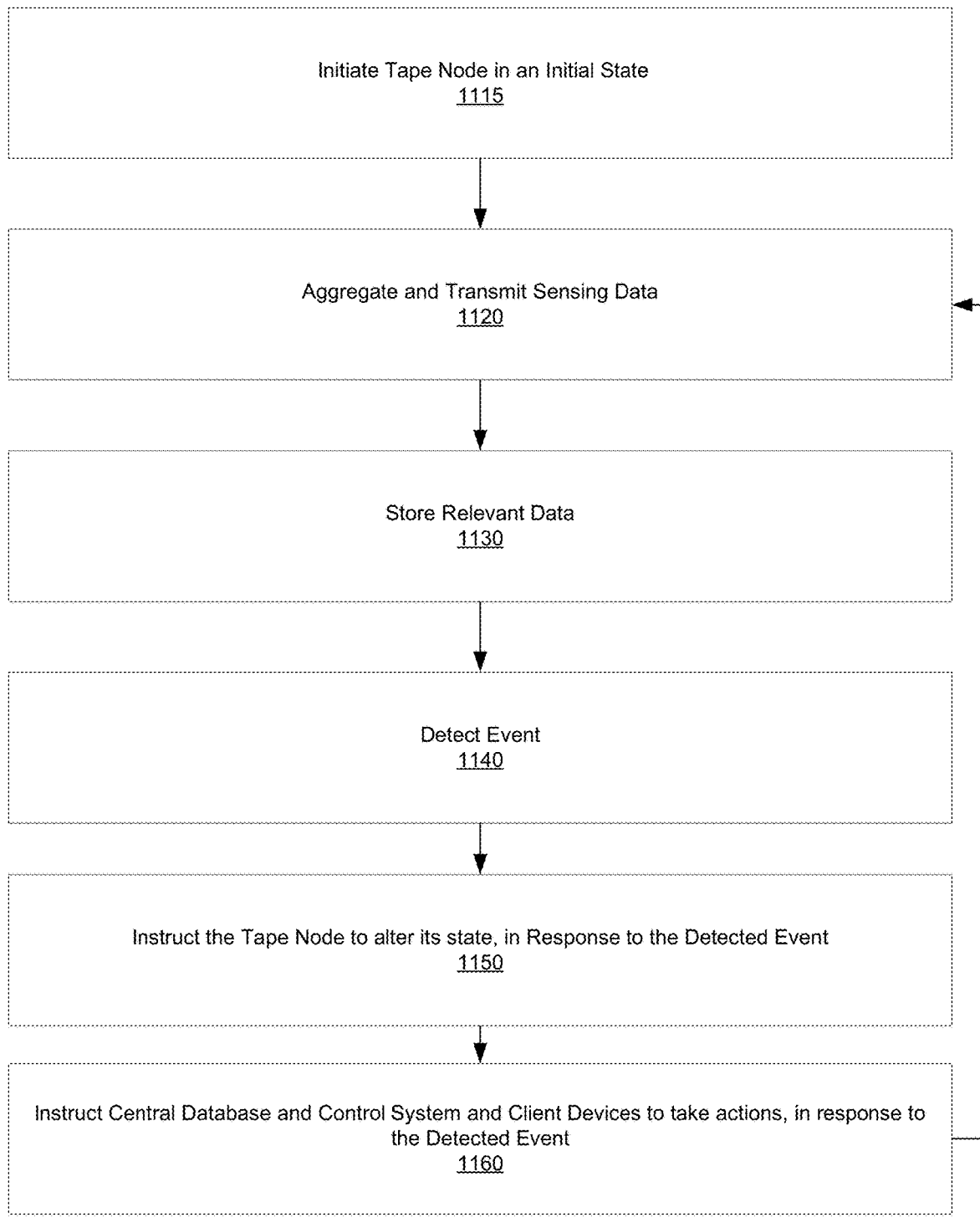
FIG. 11C is a flow chart depicting steps implemented, via execution by one or more processors of the adhesive tape platform, central database and control system, client device, or any combination thereof, by the distributed intelligent software, according to some embodiments.

FIG. 11C is a flow chart depicting steps implemented, via execution by one or more processors of the adhesive tape platform, central database and control system, client device, or any combination thereof, by the distributed intelligent software, according to some embodiments. The steps 1101 include the adhesive tape platform initiating 1115 in an initial state. The initial state may be any of the states described above or it may be another state. For example, the adhesive tape platform may initiate in the low communication state. The adhesive tape platform then aggregates and transmits 1120 sensing data according to the protocols of the initial state. The adhesive tape platform may transmit some or all of the sensing data to the central database and control system and/or client devices, based on the protocols of the initial state. Relevant data aggregated by the adhesive tape platform during the aggregation and transmitting step 1120 are stored 1130. The adhesive tape platform may store 1130 the relevant data in its own memory, according to some embodiments. The central database and or control system may store 1130 the relevant data in its database if aggregated data was received from the adhesive tape platform in step 1120, according to some embodiments. Similarly, a client device may store 1130 the aggregated data in its memory if aggregated data was received from the adhesive tape platform in step 1120 and/or if data is transmitted from the central database and control system.

Based on the relevant data and based on the logic defined in the distributed intelligent software, an event is detected 1140. The event indicates that the relevant data satisfies one or more of the rules and/or conditions included in the distributed intelligent software. For example, if the relevant data includes sensor data that vibrations on a tracked item exceed a high threshold, "a high vibration" event may be detected. If no event is detected, the process repeats, starting at step 1120.

The events may include, but are not limited to the following examples: a sensor in the tape node has taken a measurement that is above a threshold value; a sensor in the tape node has taken a measurement that is below a threshold value; a sensor in the tape node has taken a measurement that is below or equal to a high threshold value and above or below a low threshold value; values of sensing data within a frequency band are higher than a threshold value associated with the frequency band; values of sensing data within a frequency band are lower than a threshold value associated with the frequency band, values of sensing data within a frequency band are higher than or equal to a low threshold value and lower than or equal to a high threshold value associated with the frequency band; a sensor in the tape node is unable to take a measurement (e.g., the sensor is malfunctioning); a two-dimensional bar code on the tape node is scanned by a client device; a client device has initiated communication with the tape node; after a period of time has elapsed after a sensor in the tape node has taken a measurement that is above a threshold value the sensor takes another measurement that is also above the threshold value; after a period of time has elapsed after a sensor in the tape node has taken a measurement that is above a threshold value, the sensor takes another measurement that is now below the threshold value; after a period of time has elapsed after a sensor in the tape node has taken a measurement that is below a threshold value; the sensor takes another measurement that is also below the threshold value; after a period of time has elapsed after a sensor in the tape node has taken a measurement that is below a threshold value, the sensor takes another measurement that is now above the threshold value; after a period of time has elapsed after a sensor in the tape node has taken a measurement that is above a first threshold value and below a second threshold value; the sensor takes another measurement that is also above the first threshold value and below the second threshold value; after a period of time has elapsed after a sensor in the tape node has taken a measurement that is above a first threshold value and below a second threshold value the sensor takes another measurement that is now below the first threshold value or above the second threshold value; a location of the tape node is within a threshold proximity of a target location; a specific duration of time has elapsed since a preceding event (e.g., 5 days have passed since the two-dimensional bar code was scanned); stored energy on an energy storage device (e.g., a battery) on the tape node is below a threshold value or above a threshold value; a specific type of sensor (e.g., light sensor) on the tape node detects a measured signal that is above a threshold value or below a threshold value (e.g., a light sensor detects an above threshold presence of light); the tape node receives a communication from another tape node; the tape node receives a configuration file from another tape node, a gateway device, a client device, the central database and control system, or some combination thereof; the tape node receives data indicating that another tape node in proximity to itself has a battery level below a threshold value or above a threshold value; and the tape node detects another tape node in proximity to the tape node.

In response to detecting 1140 the event, execution of the distributed intelligent software causes 1150 the tape node to alter its state. As discussed above, the instructions may be generated by one or more of the tape nodes, generated and transmitted to the tape node by the central database and control system, generated and transmitted to the tape node by the one or more client devices, or some combination thereof. The tape node then enters a state based on the instruction 1150 from the distributed intelligent software. For example, the tape node may enter a high sensing mode, as described above. In some embodiments, the tape node may also exit the initial state based on the instruction 1150 according to the distributed intelligent software.

The distributed intelligent software also instructs 1160 the central database and control system and the one or more client devices to take corresponding actions, in response to detecting 1140 the event. In some embodiments, execution of the distributed intelligent software causes (e.g., instructs) 1160 the central database and control center to take one or more of the following actions, based on the detected event: transmit a notification to a client device, for example an alert; generate and transmit instructions to the tape node (e.g., instructions to alter the state of the tape node); store a log of the detected event; store a log indicating that the tape node has altered its state; store data received from the tape node and/or client devices; transmit sensor data to a client device; and transmit instructions to a client device (e.g., instructions to update a display on the client device). The instructions for the central database and control system may include actions not listed above. The distributed intelligent software may issue multiple instructions simultaneously or sequentially. For example, the central database and control system may receive instructions to both store a log of the detected event and transmit a notification to a client device.

In some embodiments, the distributed intelligent software causes 1160 a client device to take one or more of the following actions, based on the detected event: display a notification on the display of the client device (e.g., an alert); transmit instructions to the tape node (e.g., instructions to alter the state of the tape node); store a log of the detected event in the client device's memory; store a log indicating that the tape node has altered its state in the client device's memory; store data received from the tape node and/or the central database and control system in the client device's memory; transmit data to the central database and control system; transmit instructions to the central database and control system. The instructions for client devices may include actions not listed above. The distributed intelligent software may issue multiple instructions simultaneously or sequentially. For example, the client device may receive instructions to both store a log of the detected event and display a notification on the display of the client device.

Fabrication

Figure 12:
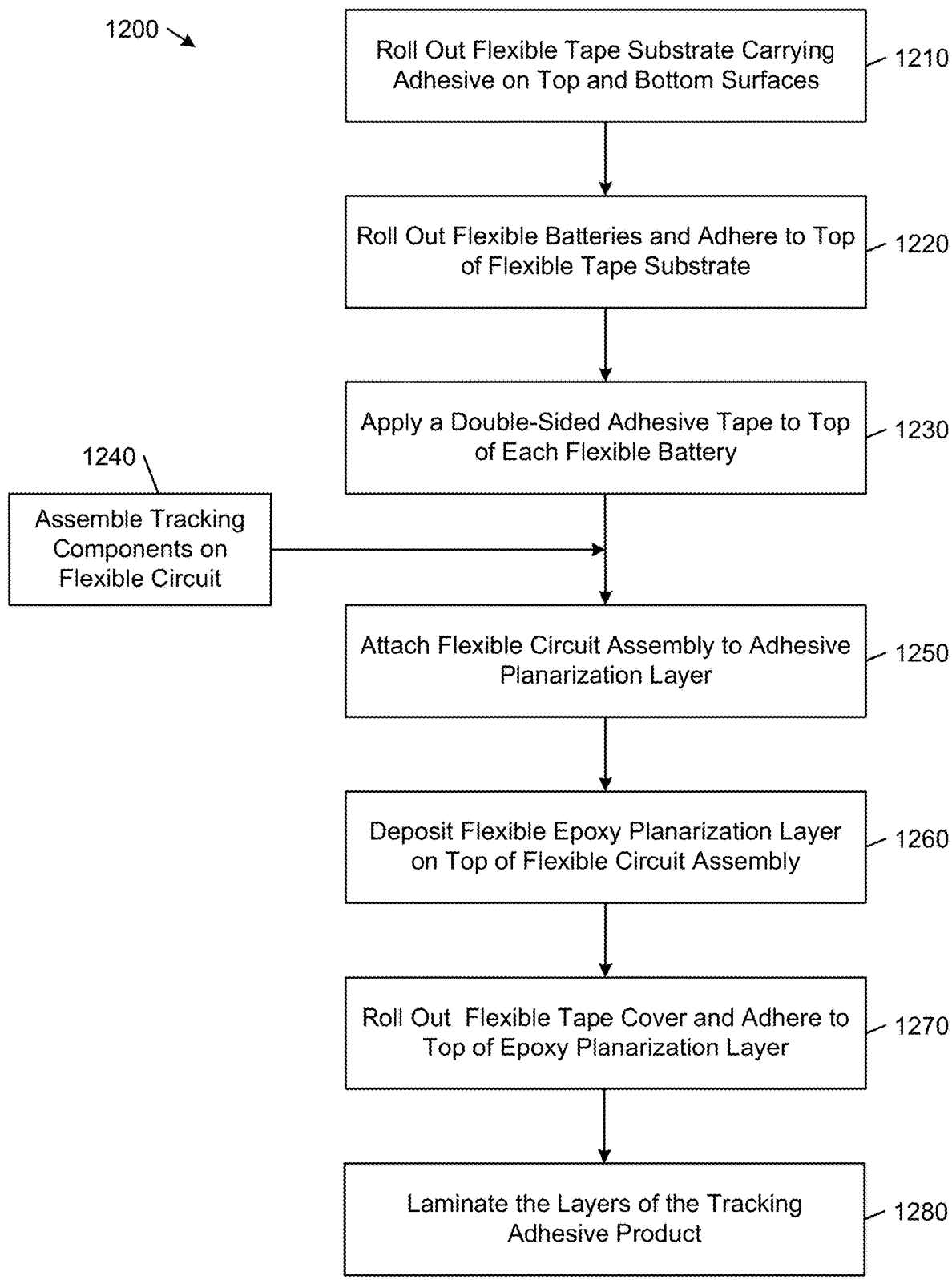
FIG. 12 shows an example method of fabricating the adhesive tape platform according to a roll-to-roll fabrication process, according to some embodiments.

FIG. 12 shows an example method 1200 of fabricating the adhesive tape platform 100 according to a roll-to-roll fabrication process.

In accordance with the method 1200, a double-sided adhesive flexible tape substrate 110 is rolled out (FIG. 12, block 1210). In this example, the flexible tape substrate 110 includes respective adhesive layers 112, 114 on the top and bottom surfaces of the flexible tape substrate 110 (i.e., the flexible tape substrate 110 incorporates layers 112 and 114). In some examples, the flexible substrate 110 may be implemented by a prefabricated double-sided pressure-sensitive adhesive tape. In other examples, the adhesive layers 112, 114 are applied to the flexible substrate 110 during manufacture of the adhesive tape platform 100 (e.g., in a process step that precedes process block 1210). The flexible tape substrate 110 may have apertures 27 pre-cut from the substrate 110 in predetermined locations, according to some embodiments. In other embodiments, apertures 28 is cut out from the flexible tape substrate after it is rolled out.

In embodiments where a flexible battery is between the flexible circuit 116 and the flexible substrate 110 (see FIGS. 5A-5C), flexible batteries on a tape are rolled out and adhered to the top of the flexible substrate 110 by the adhesive layer 112 (FIG. 12, block 1220). In some examples, each flexible battery is prefabricated. In some of these examples, the flexible batteries are printed and/or laminated on a roll of flexible base tape. Each of the flexible batteries includes one or more printed electrochemical cells, an anode, and a cathode. During assembly of the adhesive tape platform 100, individual flexible batteries are separated automatically from the roll of flexible base tape and attached to the top of the flexible tape substrate 110 at spaced apart locations. In some examples, each flexible battery is located in a respective segment 102, 104 of the adhesive tape platform 100.

A double-sided adhesive tape 118 is applied to the top surfaces of the flexible batteries (FIG. 12, block 1230). In some other examples, instead of applying the double-sided adhesive tape 118, an adhesive planarization layer can be deposited on the top of the flexible batteries. In some of these other examples, the adhesive planarization layer creates a planar surface for the device layer across the entirety of each segment 102, 104 of the adhesive tape platform 100.

The components of the flexible circuit 116 are assembled and mounted on the flexible circuit 116 (FIG. 12, block 1240). In some embodiments, the components of the flexible circuit 116 includes the rigid element 28 and the one or more sensors 94 (see FIGS. 4B and 5A). In some examples, this assembly occurs in a separate tape-based, roll-to-roll or sheet-to-sheet process in parallel with the main process flow. The resulting flexible circuit assembly is attached to the adhesive planarization layer (FIG. 12, block 1250). In this way, the fabrication process involves a hierarchical assembly approach in which one or more smaller tape-based modules (i.e., Systems-on-Tape), such as the flexible circuit assemblies created in block 1240, are created and subsequently integrated into a larger System-on-Tape.

As explained above, in some examples, the flexible circuit 116 is a double access flex circuit that includes a front-side conductive pattern that interconnects the communication systems 72, 74, the processor 90, the one or more sensors 94, and the memory 96, and allows through-hole access to a back-side conductive pattern that is mechanically and electrically connected to the flexible battery. In these examples, the front-side conductive pattern of the flexible circuit 116 connects the communications circuits 82, 86 to their respective antennas 84, 88 and to the processor 90, and also connects the processor 90 to the one or more sensors 94 and the memory 96. The active electronics (e.g., the processor 90, the communications circuits 82, 86, and the sensors) on the front-side of the flexible circuit 116 are electrically connected to a backside conductive pattern of the flexible circuit 116 by means of one or more through-hole vias in the substrate of the flexible circuit 116. In some embodiments, the sensors 94, the rigid element 28, or some combination thereof pass through the through-hole vias in the substrate of the flexible circuit 116. In further embodiments, the sensors 94, the rigid element 28, or some combination thereof pass through the through-hole vias to the aperture 27. The backside conductive pattern defines contact pads that are mechanically and electrically coupled to the electrodes of the flexible battery in order to power the active electronics on the front-side of the flexible circuit 120. In some examples, the contact pads are bonded to the flexible battery electrodes using electrically conductive ink or an electrically conductive adhesive. In other examples, at least a portion of the flexible battery 116 is printed on the front-side of the flexible circuit 120, in which case a single-sided flex circuit may be used instead of the double access flex circuit.

A flexible polymer planarization layer is deposited on top of the flexible circuit assembly (FIG. 12, block 1260). In some examples, the flexible polymer is a flexible epoxy (e.g., silicone). The flexible polymer planarization layer encapsulates the device layer 122 and thereby reduces the risk of damage that may result from the intrusion of contaminants and/or liquids (e.g., water). The flexible polymer planarization layer also planarizes the device layer 122. In some examples, the flexible polymer planarization layer planarizes the entirety of each segment 102, 104 of the adhesive tape platform 100.

A single-sided flexible cover layer 128 (also referred to herein as a "flexible tape cover") is rolled out and adhered to the top of the flexible polymer planarization layer (FIG. 12, block 1270). In this example, the flexible cover 128 includes a pressure-sensitive adhesive layer on the backside of the flexible tape cover 128 (i.e., the flexible cover 128 incorporates the pressure-sensitive adhesive layer). In some examples, the flexible tape cover 128 may be implemented by a prefabricated single-sided pressure-sensitive adhesive tape. In other examples, the adhesive layer is applied to the flexible tape cover 128 during manufacture of the adhesive tape platform 100 (e.g., in a process step that precedes process block 1270).

In some embodiments, the flexible cover layer 128 includes one or more apertures 27 that are pre-cut from the flexible tape cover before it is rolled out. In other embodiments, the flexible cover layer 128 has the apertures 27 cut out after the flexible tape cover has been rolled out. An optional adhesive may be applied to the top of the flexible tape cover for a double-sided adhesive tape configuration.

After the flexible tape cover has been adhered to the top of the flexible polymer planarization layer, the resulting multilayer adhesive tape platform structure is laminated (FIG. 12, block 1280). In some examples, the multilayer adhesive tape platform structure is annealed at a suitable annealing temperature (e.g., 120° C.). A variety of different annealing equipment may be used to anneal the multilayer adhesive tape platform structure. In some examples, the adhesive tape platform structure is annealed in a laminator.

Figure 13A:
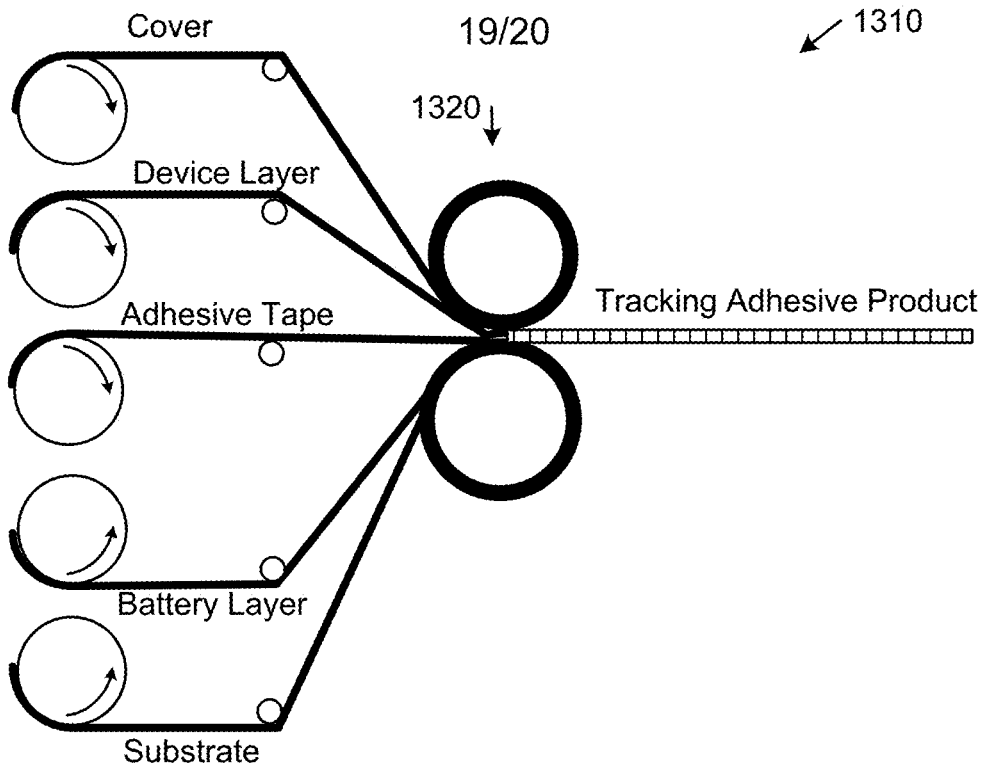
FIGS. 13A-13B are example diagrams illustrating methods of fabricating the adhesive tape platform, according to some embodiments.

Referring to FIG. 13A, in one example, a laminator 1310 is used to anneal and laminate the component elements of the adhesive tape platform 100. In this example, the laminating rolls 1320 of the laminator 1310 can apply a programmed heating intensity profile over time that is designed to avoid or at least minimize degradation of heat sensitive components of the adhesive tape platform 100, such as the flexible battery.

Figure 13B:
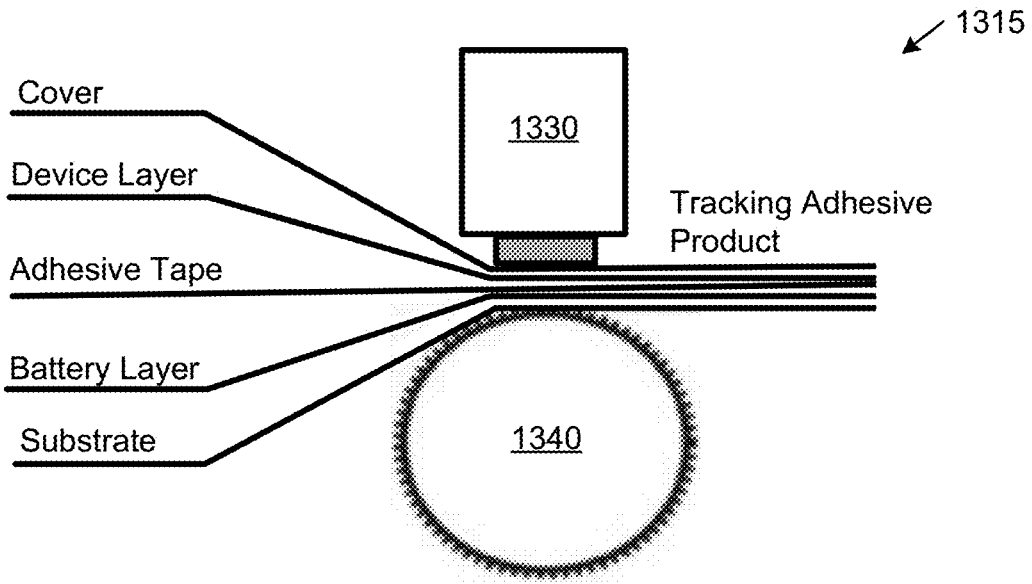

Referring to FIG. 13B, in another example, a laminator 1315 that includes an anvil 1330 and an embossing roller 1340 is used to anneal and laminate the multilayer adhesive tape platform structure with bonding patterns that are designed control one or more different specific properties of the adhesive tape platform. For example, the combination and pressure and an embossing pattern that is selected to increase the adhesion between the constituent layers of the adhesive tape platform 100. The bonding patterns also can be designed to increase adhesive between the layers while preserving the functionality and performance of the electronic and other components of the adhesive tape platform 100, such as the flexible battery and the antennas 84, 88. For example, the constituent layers of the adhesive tape platform 100 can be embossed with an embossing pattern with a spatial frequency that is selected to minimize any deformation or other change in the structure or properties of one or more of the antennas that would result in degrading one or more performance characteristics of the antennas (e.g., gain, radiation pattern, efficiency, and impedance match).

Computer Apparatus

Figure 14:
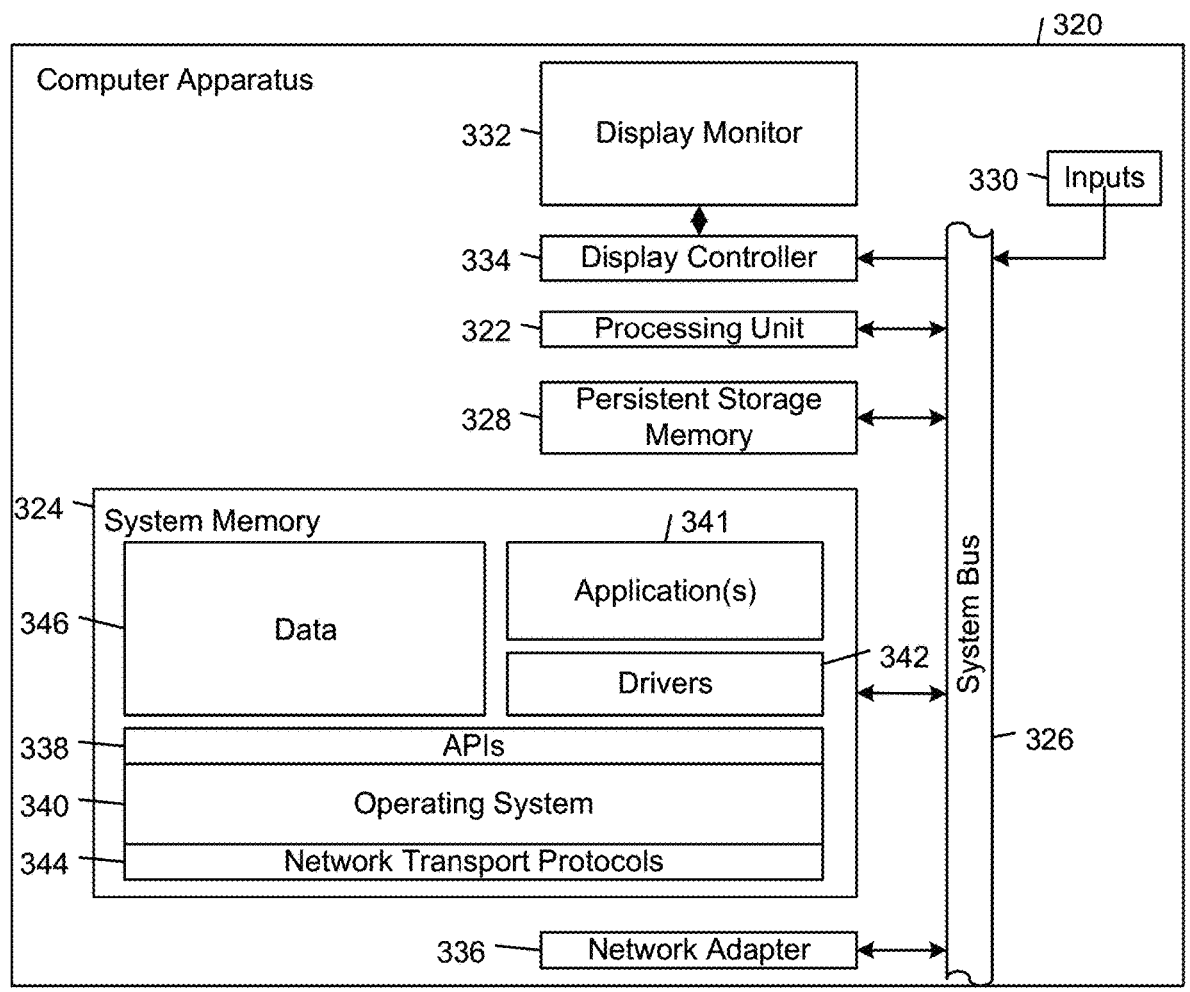
FIG. 14 shows an example embodiment of computer apparatus, according to some embodiments.

FIG. 14 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g., one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.
Additional Configuration Information The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A sensor device comprising:
   a device layer including at least a first sensor configured to measure sensor data relevant to an object of interest, the first sensor comprising a vibration sensor;
   an electronics layer including an electronic circuit connected to the first sensor;
   a flexible substrate located between the electronics layer and a first adhesive layer
   a flexible tape cover that is on the device layer opposite the flexible substrate, the flexible tape cover covering the device layer; and
   a coupling element, located in a first aperture, the coupling element coupling the first sensor to the object of interest when the sensor device is attached to the object of interest, wherein
   the coupling element has a first damping capacity that is lower than a second damping capacity of a material of the first substrate or that is lower than a third damping capacity of a material of the flexible cover layer, and
   the first aperture is in one of the flexible substrate and the flexible tape cover, overlapping the first sensor and exposing the coupling element to the object of interest.

2. The sensor device of claim 1, wherein the first sensor further comprises a temperature sensor, the coupling element further comprises a material with a first thermal conductivity that is higher than a thermal conductivity of a material of the flexible substrate or a thermal conductivity of the flexible tape cover, and the coupling element forms a thermally conductive pathway between the object of interest and the first sensor.

3. The sensor device of claim 1, further comprising:
   a flexible planarizing layer in between the device layer and the flexible cover layer that planarizes a top surface of the device layer; and
   another adhesive layer between the electronics layer and the substrate.

4. The sensor device of claim 1, the device layer further comprising:
   a processor;
   a memory;
   one or more antennas;
   one or more communication interfaces connected to the one or more antennas; and
   one or more energy storage components that supply power to components of the device layer, wherein
   the electronic circuit is connected to the one or more antennas, the one or more communication interfaces, the processor, the one or more energy storage components, and the memory.

5. The sensor device of claim 1, wherein the vibration sensor is one of an accelerometer-based vibration sensor, a velocity-based vibration sensor, a capacitive-based vibration sensor, and a strain-based vibration sensor.

6. The sensor device of claim 1, further comprising a second aperture in the first adhesive layer at least partially aligned with the first aperture, wherein
   the first aperture is in the flexible substrate,
   the coupling element extends from the device layer to a bottom surface of the flexible substrate through the first aperture and the second aperture, and a first surface of the rigid element directly contacts the object of interest when the sensor device is attached to the object of interest.

7. The sensor device of claim 1, wherein the first sensor further comprises an array of sensors, and a surface of the coupling element physically contacts at least one of the vibration sensor and a sensor in the array of sensors.

8. The sensor device of claim 7, wherein the coupling element comprises an array of coupling elements, each coupling element physically contacting a corresponding sensor in the array of sensors.

9. The sensor device of claim 1, the coupling element comprising a flange that extends from a base of the coupling element and is configured to be fastened to a portion of one or more of the electronic circuit, the device layer, the flexible substrate, and the flexible cover layer.

10. The sensor device of claim 1, coupling element having one or more of a length less than 2 cm, a width less than 2 cm., and a thickness less than 1 cm.

11. The sensor device of claim 1, wherein the coupling element comprises a material that has a first electrical conductivity that is higher than an electrical conductivity of a material of the flexible substrate or is higher than an electrical conductivity of a material of the flexible cover layer.

12. The sensor device of claim 1, wherein the coupling element is at least partially optically transparent.

13. The sensor device of claim 1, wherein the sensor device further comprises at least a second sensor comprising at least one of a group comprising: an optical sensor, an infrared light sensor, an inductance sensor, an electrical current or voltage sensor, an electrical resistance sensor, a time of flight sensor, a depth sensor, a distance sensor, a sensor that is configured to detect moisture, a water sensor, a motion sensor, and an accelerometer.

14. A sensor device comprising:
a flexible substrate comprising:
a substrate layer,
a first adhesive layer on the substrate layer;
a device layer on the flexible substrate comprising:
at least a first sensor configured to measure sensor data relevant to an object of interest, the first sensor at least partially aligned with an aperture in the substrate layer;
a rigid element beneath the device layer and at least partially aligned with the aperture in the substrate layer, wherein a first surface of the rigid element is configured to directly contact the object of interest when the sensor device is attached to the object of interest, a second surface of the rigid element is configured to physically contact the first sensor, and the aperture exposes the first surface of the rigid element to the object of interest when the sensor device is attached to the object of interest
an electronics layer, the electronics layer comprising an electronic circuit connected to the first sensor; and
a flexible cover layer on the device layer, the flexible cover layer covering the device layer and the flexible substrate.

15. The sensor device of claim 14, wherein the first sensor comprises a plurality of sensors and is configured to collect sensor data relevant to the object of interest, each of the plurality of sensors overlapping the aperture in the substrate layer and configured to directly contact the surface of the object of interest when the sensor device is attached to the object of interest.

16. The sensor device of claim 14, wherein the first sensor extends from the device layer to the flexible substrate through the aperture in the substrate layer.

17. The sensor device of claim 14, wherein a surface of the first sensor is at a same height as or is at a height below a lower surface of the flexible substrate.

18. The sensor device of claim 14, wherein a protective cover covers the aperture in the substrate layer.

19. A sensor device comprising:
a flexible substrate comprising:
a substrate layer,
a first adhesive layer on the substrate layer;
a device layer on the flexible substrate comprising:
at least a first sensor configured to measure sensor data relevant to an object of interest, the first sensor at least partially aligned with an aperture in the substrate layer exposing a portion of the first sensor, wherein the portion of the first sensor is configured to directly contact the object of interest when the sensor device is attached to the object of interest;
an electronics layer, the electronics layer comprising an electronic circuit connected to the first sensor; and
a flexible cover layer on the device layer, the flexible cover layer covering the device layer and the flexible substrate, wherein
the first sensor extends from the device layer to the flexible substrate through the aperture in the substrate layer.

20. The sensor device of claim 19, wherein a protective cover covers the aperture in the substrate layer.

* * * * *